(12) United States Patent  (10) Patent No.: US 7,400,813 B2
Zimmel  (45) Date of Patent: Jul. 15, 2008

(54) FIBER OPTIC SPLITTER MODULE

(75) Inventor: Steven C. Zimmel, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 13 days.

(21) Appl. No.: 11/138,063

(22) Filed: May 25, 2005

(65) Prior Publication Data

US 2006/0269205 A1 Nov. 30, 2006

(51) Int. Cl.
*G02B 6/00* (2006.01)
*G02B 6/44* (2006.01)

(52) U.S. Cl. ...................................................... 385/135

(58) Field of Classification Search ........................ None
See application file for complete search history.

(56) References Cited

U.S. PATENT DOCUMENTS

| | | | |
|---|---|---|---|
| 5,189,410 A | 2/1993 | Kosugi et al. | |
| 5,317,663 A | 5/1994 | Beard et al. | |
| 5,339,379 A | 8/1994 | Kutsch et al. | |
| 5,363,465 A | 11/1994 | Korkowski et al. | |
| 5,432,875 A | 7/1995 | Korkowski et al. | |
| 5,497,444 A | 3/1996 | Wheeler | |
| 5,613,030 A * | 3/1997 | Hoffer et al. ................ | 385/135 |
| 5,627,925 A | 5/1997 | Alferness et al. | |
| 5,694,511 A | 12/1997 | Pimpinella et al. | |
| 5,701,380 A | 12/1997 | Larson et al. | |
| 5,717,810 A | 2/1998 | Wheeler | |
| 5,946,440 A | 8/1999 | Puetz | |
| 6,208,796 B1 | 3/2001 | Vigliaturo | |
| 6,226,111 B1 | 5/2001 | Chang et al. | |
| 6,263,136 B1 | 7/2001 | Jennings et al. | |
| 6,307,998 B2 | 10/2001 | Vigliaturo | |
| 6,363,183 B1 | 3/2002 | Koh | |
| 6,370,294 B1 | 4/2002 | Pfeiffer et al. | |
| 6,418,262 B1 | 7/2002 | Puetz et al. | |
| 6,424,781 B1 | 7/2002 | Puetz et al. | |
| 6,532,332 B2 | 3/2003 | Solheid et al. | |
| 6,535,682 B1 | 3/2003 | Puetz et al. | |

(Continued)

FOREIGN PATENT DOCUMENTS

DE 41 30 706 A1 3/1993

(Continued)

OTHER PUBLICATIONS

ADC Telecommunications, Inc., OmniReach FTTP Solutions, Doc. No. 1276550, dated May 2004, 12 pp.

(Continued)

*Primary Examiner*—Michelle Connelly-Cushwa
*Assistant Examiner*—Omar Rojas
(74) *Attorney, Agent, or Firm*—Merchant & Gould P.C.

(57) ABSTRACT

A telecommunications assembly including a housing and a plurality of modules mounted within the housing. The modules includes a rear face in which is mounted at least one fiber optic connector. Within an interior of the housing are positioned at least one fiber optic adapters. Inserting the module through a front opening of the housing at a mounting location positions the connector of the module for insertion into and mating with the adapter of the housing. The adapters within the interior of the housing are integrally formed as part of a removable adapter assembly. A method of mounting a telecommunications module within a chassis.

22 Claims, 38 Drawing Sheets

U.S. PATENT DOCUMENTS

| | | |
|---|---|---|
| 6,556,738 B2 | 4/2003 | Pfeiffer et al. |
| 6,556,763 B1 | 4/2003 | Puetz et al. |
| 6,579,014 B2 | 6/2003 | Melton et al. |
| 6,591,051 B2 | 7/2003 | Solheid et al. |
| 6,614,953 B2 | 9/2003 | Strasser et al. |
| RE38,311 E | 11/2003 | Wheeler |
| 6,647,197 B1 | 11/2003 | Marrs et al. |
| 6,668,108 B1 | 12/2003 | Helkey et al. |
| 6,760,531 B1 | 7/2004 | Solheid et al. |
| 6,810,193 B1 | 10/2004 | Müller |
| 6,850,685 B2 | 2/2005 | Tinucci et al. |
| 6,885,798 B2 | 4/2005 | Zimmel |
| 7,142,764 B2 | 11/2006 | Allen et al. |
| 7,194,181 B2 | 3/2007 | Holmberg et al. |
| 2002/0181896 A1 | 12/2002 | McClellan et al. |
| 2003/0031423 A1 | 2/2003 | Zimmel |
| 2003/0132685 A1 | 7/2003 | Sucharczuk et al. |
| 2003/0134541 A1 | 7/2003 | Johnsen et al. |
| 2003/0147597 A1 | 8/2003 | Duran |
| 2003/0169974 A1 | 9/2003 | Ngo |
| 2003/0185535 A1 | 10/2003 | Tinucci et al. |
| 2003/0202765 A1 | 10/2003 | Franklin et al. |
| 2004/0240826 A1 | 12/2004 | Daoud et al. |
| 2005/0002633 A1 | 1/2005 | Solheid et al. |
| 2005/0053341 A1 | 3/2005 | Zimmel |
| 2005/0067847 A1 | 3/2005 | Zellak |
| 2005/0105873 A1 | 5/2005 | Reagan et al. |
| 2005/0105879 A1 | 5/2005 | Kanasaki et al. |
| 2005/0232550 A1 | 10/2005 | Nakajima et al. |
| 2005/0232551 A1* | 10/2005 | Chang et al. .................. 385/76 |
| 2005/0232565 A1 | 10/2005 | Heggestad et al. |
| 2005/0281526 A1 | 12/2005 | Vongseng et al. |
| 2006/0083468 A1 | 4/2006 | Kahle et al. |
| 2006/0093301 A1 | 5/2006 | Zimmel et al. |
| 2006/0269206 A1 | 11/2006 | Zimmel |
| 2006/0285807 A1 | 12/2006 | Lu et al. |

FOREIGN PATENT DOCUMENTS

| | | |
|---|---|---|
| DE | 202 01 170 U1 | 5/2003 |
| EP | 0 730 177 A2 | 9/1996 |
| EP | 0 828 356 A2 | 3/1998 |
| EP | 1 092 996 A2 | 4/2001 |
| EP | 1 107 031 | 6/2001 |
| EP | 1 179 745 | 2/2002 |
| EP | 1 473 578 A2 | 11/2004 |
| WO | WO 00/75706 | 12/2000 |
| WO | WO 02/099528 | 12/2002 |
| WO | WO 02/103429 | 12/2002 |
| WO | WO 02/103429 A2 | 12/2002 |
| WO | WO 03/093889 A1 | 11/2003 |

OTHER PUBLICATIONS

ADC Telecommunications, Inc., DSX-3 Digital Signal Cross-Connect, Doc. No. 274, dated Oct. 2004, 65 pp.

Pending U.S. Appl. No. 11/138,889, filed May 25, 2005, entitled "Fiber Optic Adapter Module".

Pending U.S. Appl. No. 11/215,837, filed Aug. 29, 2005, entitled "Fiber Optic Splitter Module With Connector Access", 71 pages.

Pending U.S. Appl. No. 11/354,297, filed Feb. 13, 2006, entitled "Fiber Optic Splitter Module", 58 pages.

Prosecution History of U.S. Appl. No. 10/980,978 (OA Dec. 15, 2005; Resp. Jun. 15, 2006; OA Sep. 6, 2006; Resp. Mar. 6, 2007; OA Jun. 1, 2007).

Prosecution History of U.S. Appl. No. 11/138,889 (OA Dec. 14, 2005; Resp. Jun. 14, 2006; OA Sep. 11, 2006; Resp. Mar. 12, 2007; OA Jun. 13, 2007).

Prosecution History of U.S. Appl. No. 11/215,837 (OA Jul. 28, 2006; Resp. Oct. 30, 2006; OA Jan. 26, 2007; Resp. Apr. 26, 2007; Notice of Allowance Aug. 2, 2007).

Prosecution History of U.S. Appl. No. 11/354,297 (OA Jun. 25, 2007).

* cited by examiner

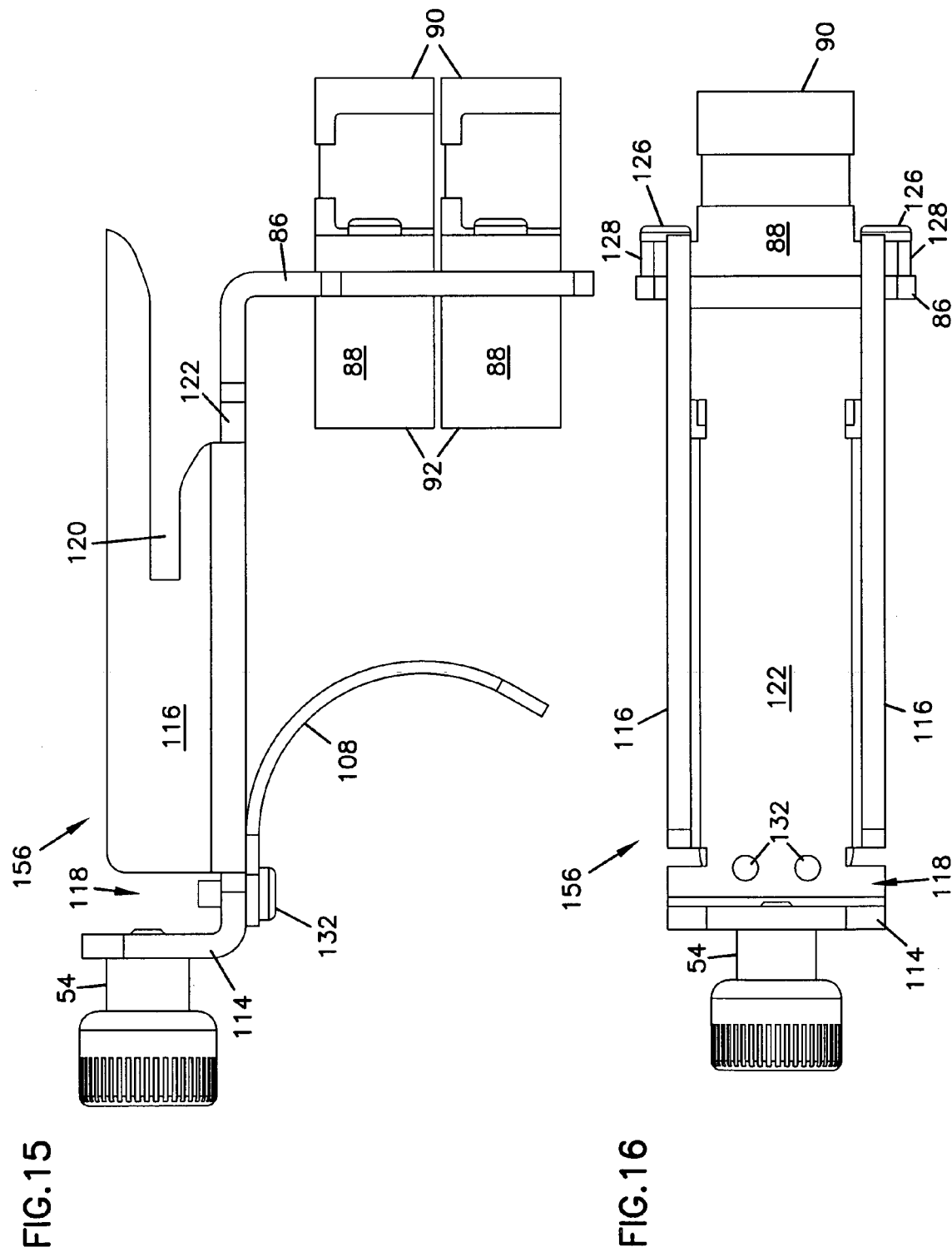

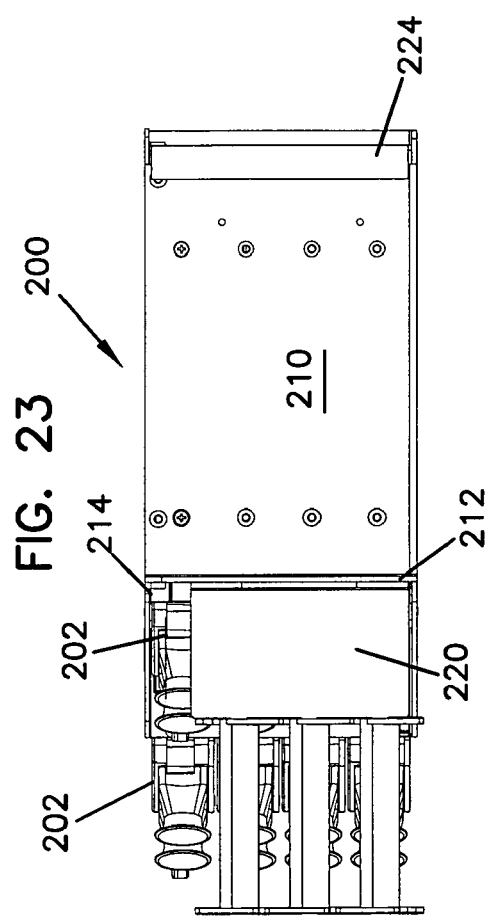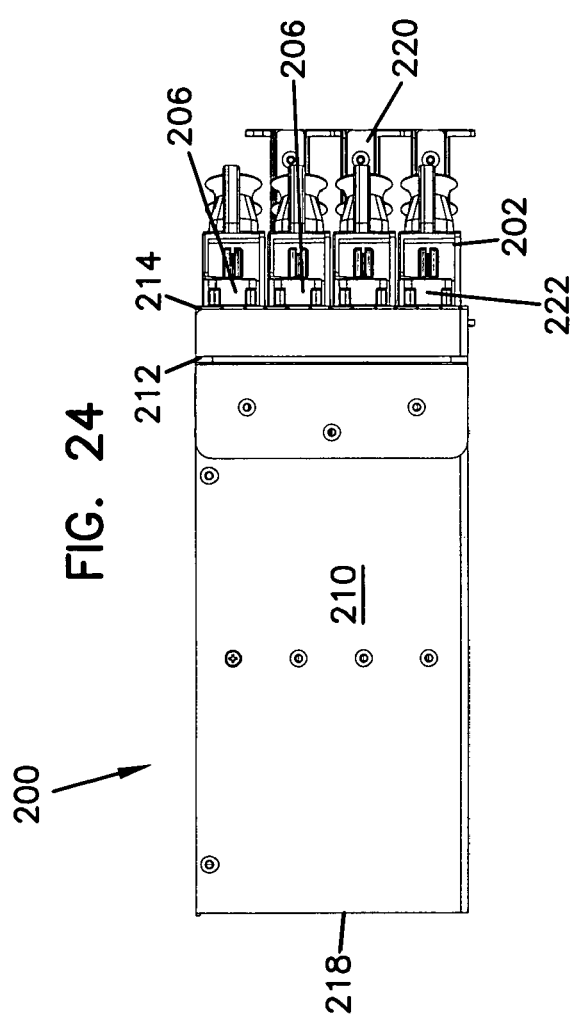

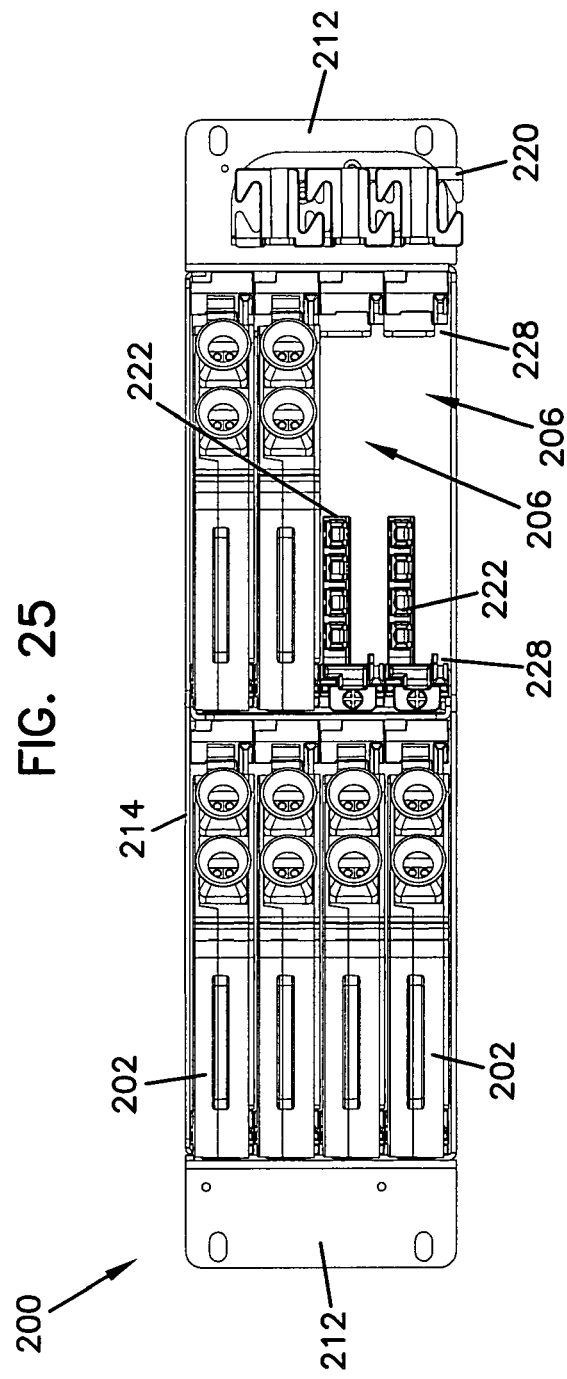
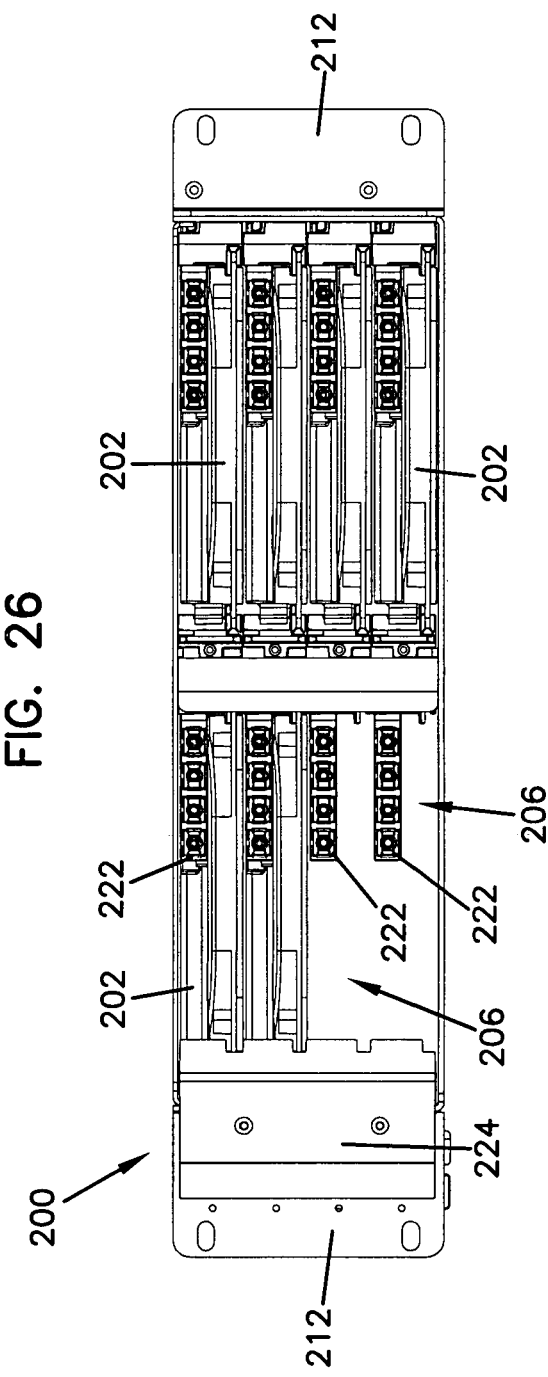

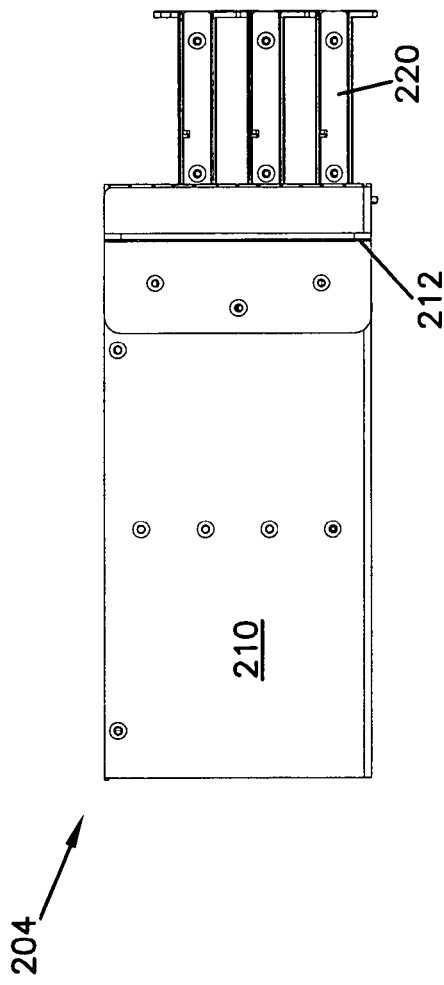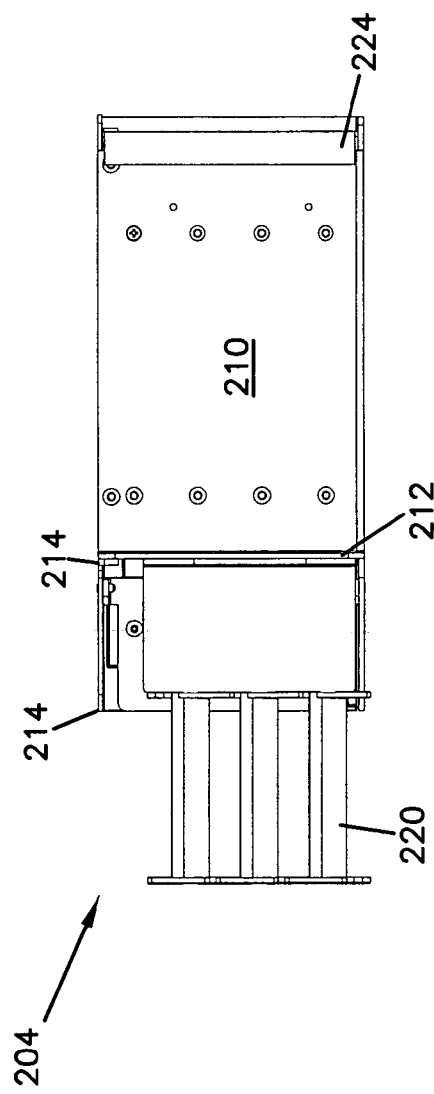

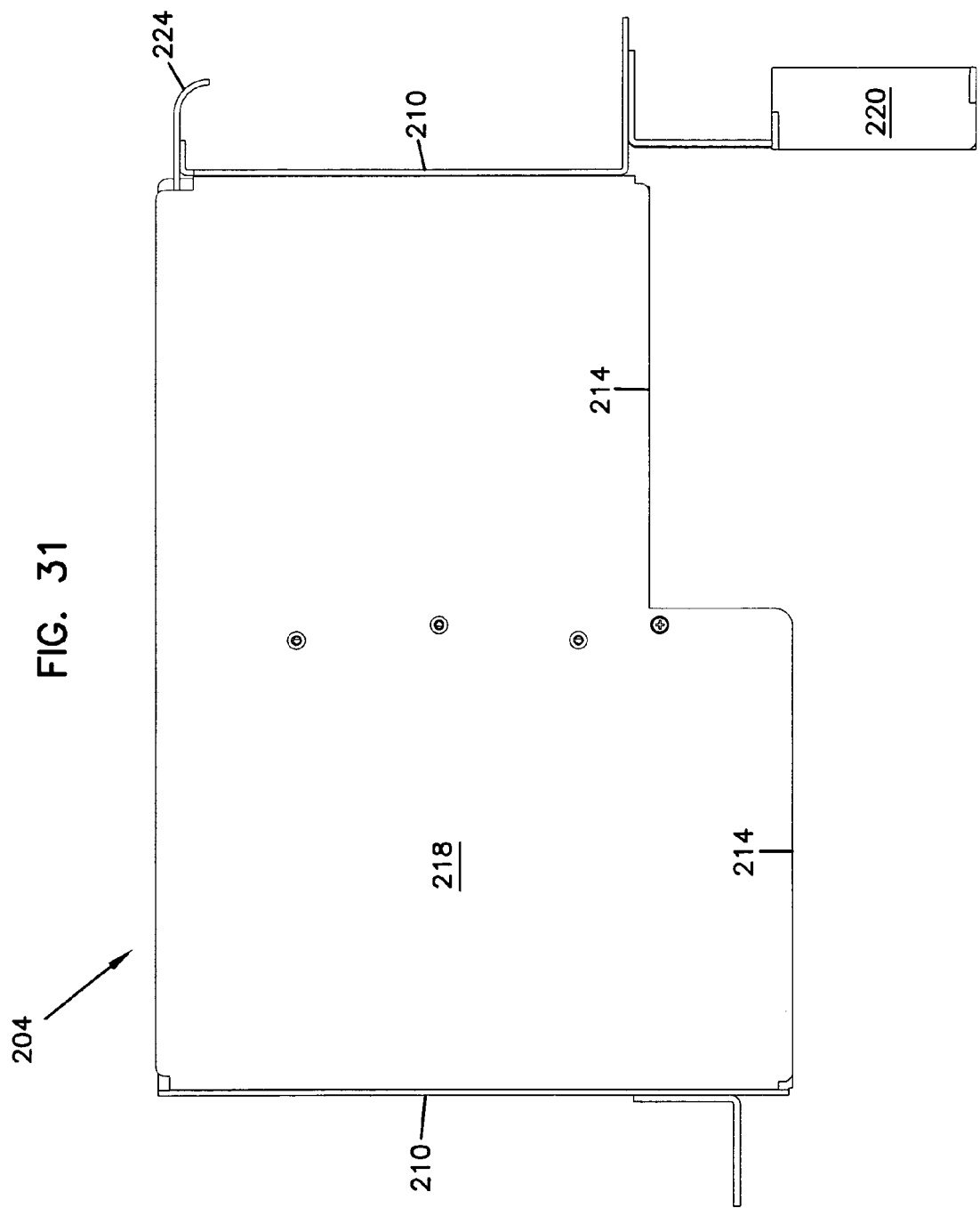

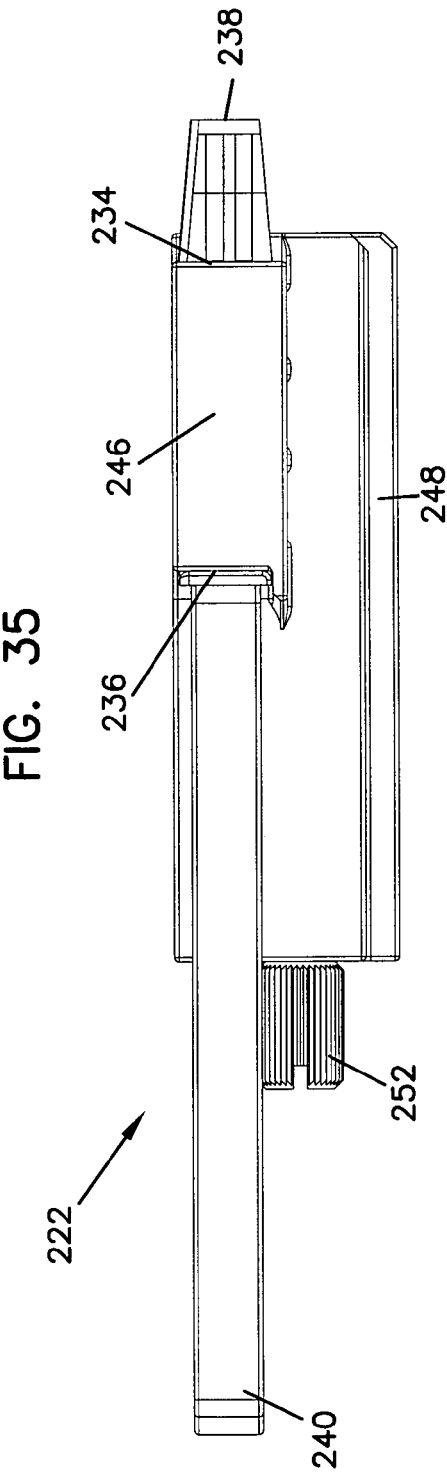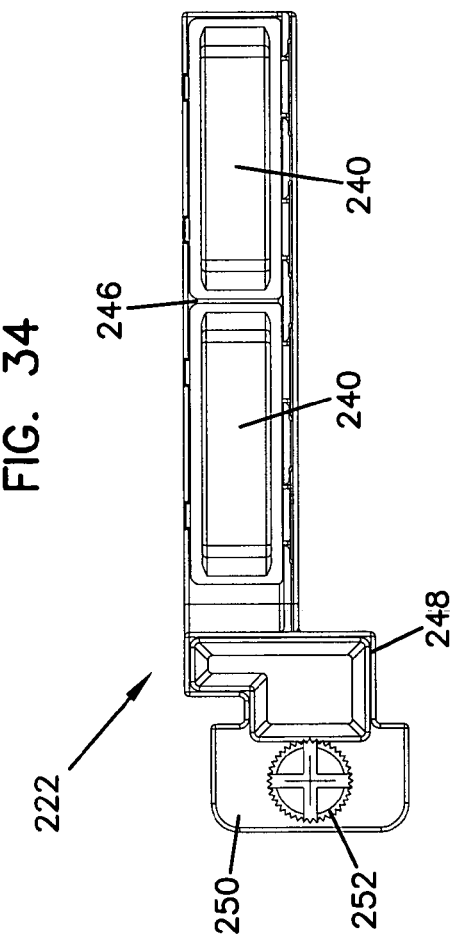
FIG. 35
FIG. 34

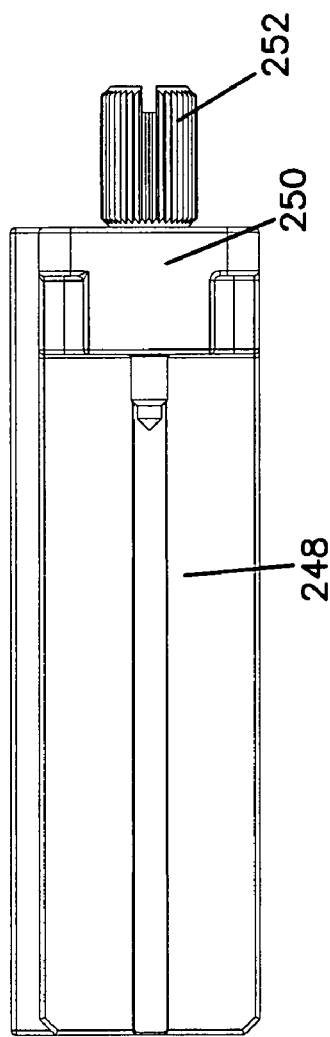
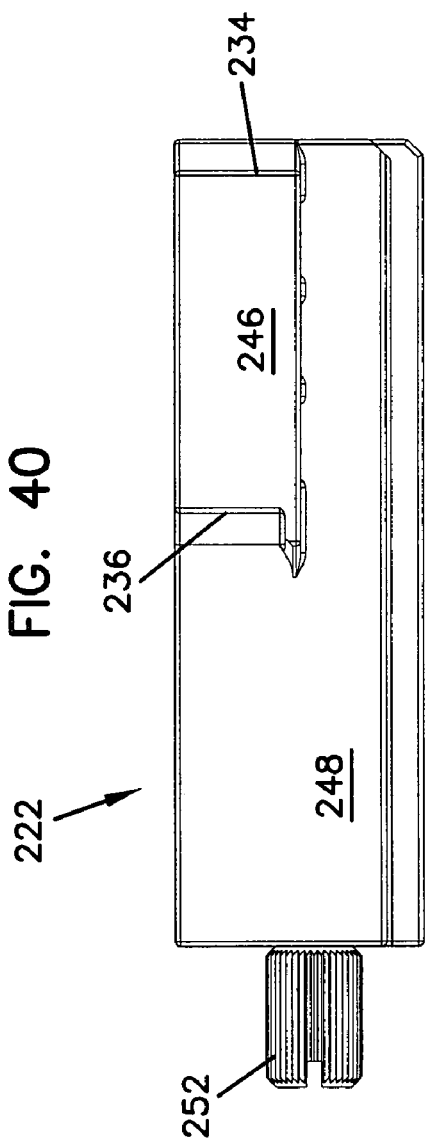
FIG. 39
FIG. 40

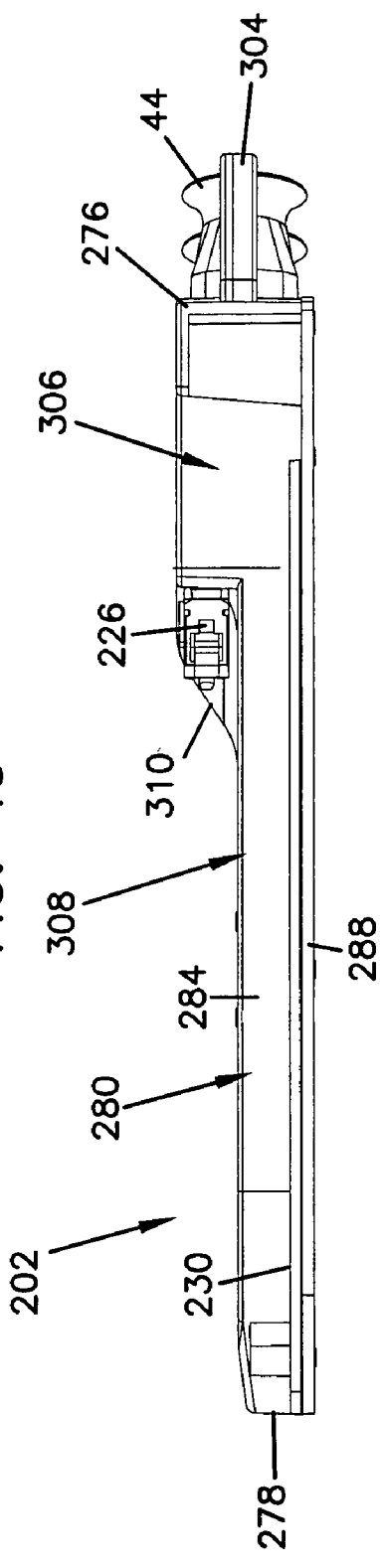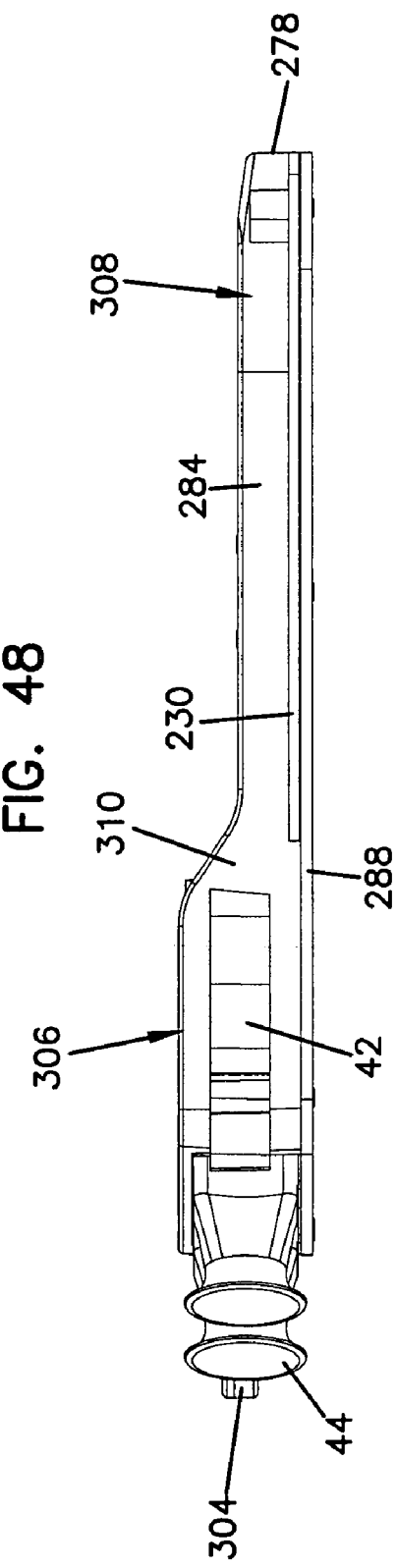

FIBER OPTIC SPLITTER MODULE

RELATED APPLICATION

The present application is related to commonly owned co-pending U.S. patent application Ser. No. 10/980,978, filed on Nov. 3, 2004, the disclosure of which is incorporated herein by reference.

FIELD

The present invention generally relates to fiber optic telecommunications equipment. More specifically, the present invention relates to fiber optic modules and chassis for holding fiber optic modules.

BACKGROUND

In fiber optic telecommunications systems, it is common for optical fibers of transmission cables to be split into multiple strands, either by optical splitting of a signal carried by a single stranded cable or by fanning out the individual fibers of a multi-strand cable. Further, when such systems are installed, it is known to provide excess capacity in the installations to support future growth and utilization of the fibers. Often in these installations, modules including splitters or fanouts are used to provide the connection between transmission fibers and customer fibers. To reduce the cost and complexity of the initial installation and still provide options for future expansion, a module mounting chassis capable of mounting multiple modules may be used in such an installation.

While the chassis may accept several modules, the initial installation may only include fewer modules mounted in the chassis, or enough to serve current needs. These chassis may be configured with limited access to one or more sides, or may be mounted in cramped locations. In addition, some of these chassis may be pre-configured with the maximum capacity of transmission cables to accommodate and link to modules which may be installed in the future. Since it is desirable to have access to components within the chassis for cleaning during the installation of a new module, some provision or feature of the chassis will desirably permit a user to access and clean the connectors of these pre-connectorized and pre-installed transmission cables.

It is also desirable for the chassis to be configured to ensure that modules are installed correctly and aligned with other components within the chassis to mate with the pre-connectorized and pre-installed transmission cables.

SUMMARY

The present invention relates to a telecommunications assembly including a housing and a plurality of modules mounted within the housing. The modules includes a bulkhead in which is mounted a plurality of fiber optic connectors. Within an interior of the housing at each mounting location are positioned a plurality of fiber optic adapters. Inserting the module through a front opening of the housing at a mounting location positions the connectors of the module for insertion into and mating with the adapters of the housing. The adapters within the interior of the housing are integrally formed within a unitary removable adapter assembly. The present invention further relates to a method of mounting a telecommunications module within a chassis.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows:

FIG. 15 is a side view of the adapter holder of FIG. 12.

FIG. 16 is a top view of the adapter holder of FIG. 12.

FIG. 23 is a first side view of the telecommunications assembly of FIG. 20.

FIG. 24 is a second side view of the telecommunications assembly of FIG. 20.

FIG. 25 is a front view of the telecommunications assembly of FIG. 20 with two of the module removed.

FIG. 26 is a rear view of the telecommunications assembly of FIG. 25.

FIG. 29 is a first side view of the chassis of FIG. 27.

FIG. 30 is a second side view of the chassis of FIG. 27.

FIG. 31 is a top view of the chassis of FIG. 27.

FIG. 34 is a front view of the adapter assembly of FIG. 32.

FIG. 35 is a first side view of the adapter assembly of FIG. 32.

FIG. 39 is a first side view of the adapter assembly of FIG. 36.

FIG. 40 is a second side view of the adapter assembly of FIG. 36.

FIG. 48 is a first side view of the splitter module of FIG. 43.

FIG. 49 is a second side view of the splitter module of FIG. 43.

DETAILED DESCRIPTION

Reference will now be made in detail to exemplary aspects of the present invention which are illustrated in the accompanying drawings. Wherever possible, the same reference numbers will be used throughout the drawings to refer to the same or similar parts.

Figure 1:
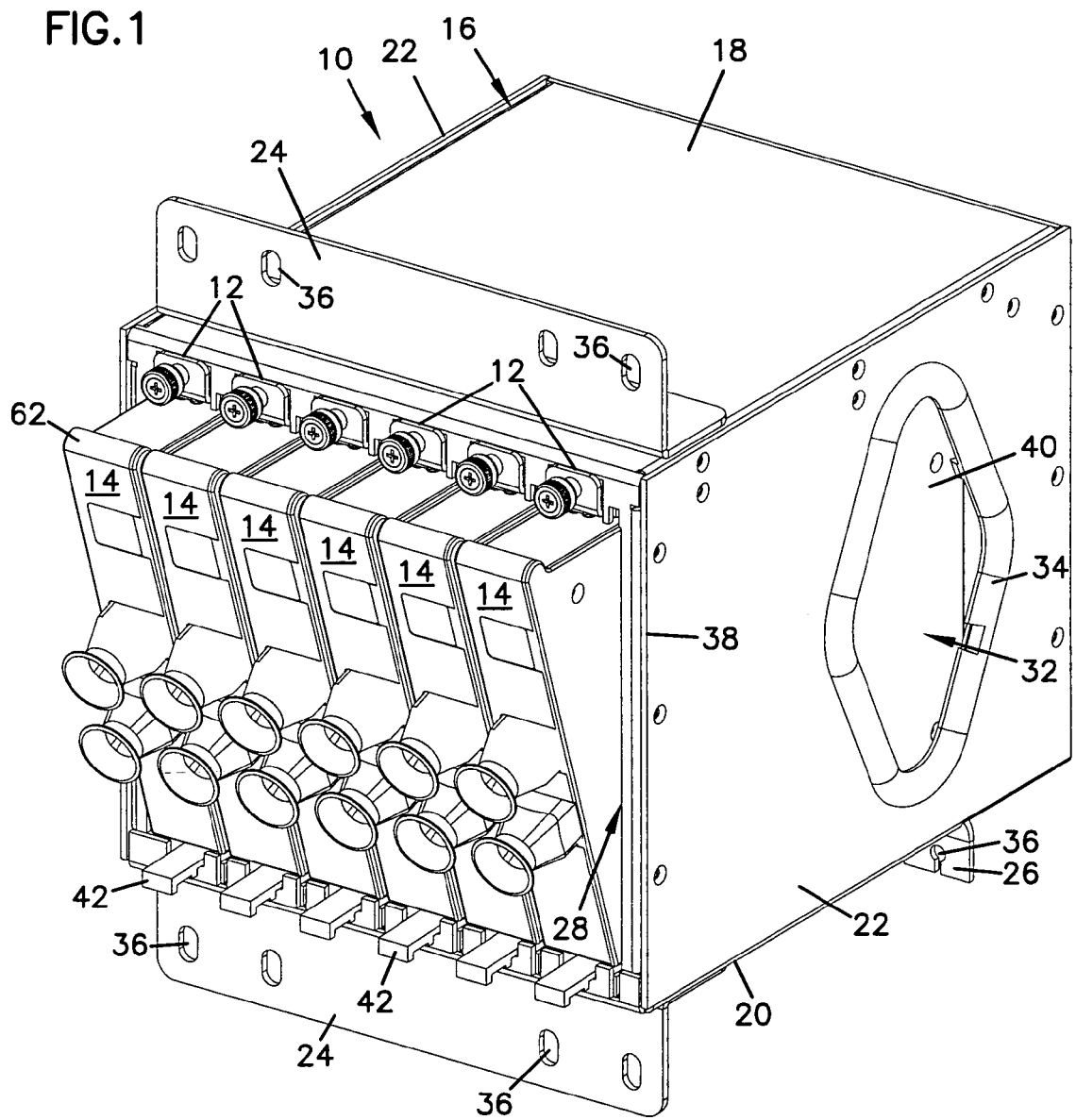
FIG. 1 is a front perspective view of a telecommunications assembly with a plurality of fiber optic modules installed through a front opening.

FIG. 1 illustrates a telecommunications assembly 10 with mounting locations 12 for mounting a plurality of modules 14. Assembly 10 includes a chassis or housing 16 with a first major side 18, a second major side 20 and a pair of opposing transverse sides 22 extending between the first and second major sides. A mounting flange 24 may be mounted to each of the major sides extending generally oppositely of each other. A secondary or alternative mounting flange 26 may also be mounted to one of the major sides to provide options for mounting housing 16 to a particular size or shape of equipment rack, cabinet or other type of installation.

Housing 16 defines a front opening 28 through which modules 14 are inserted within an interior 30 (shown below in FIG. 7) of housing 16. Openings 32 may be defined in the transverse sides 22 to permit access by a person into interior 30. Openings 32 may include a protective pad 34 about a perimeter to provide chafe and other injury to any hands which may pass into or out of interior 30 through one of the openings 32. Visible through opening 32 in FIG. 1 is a housing 40 of one of the modules 14 mounted within front opening 28. Flanges 24 and 26 may include a plurality of fastener openings 36 for mounting housing 16 where needed in a telecommunications installation.

Figure 2:
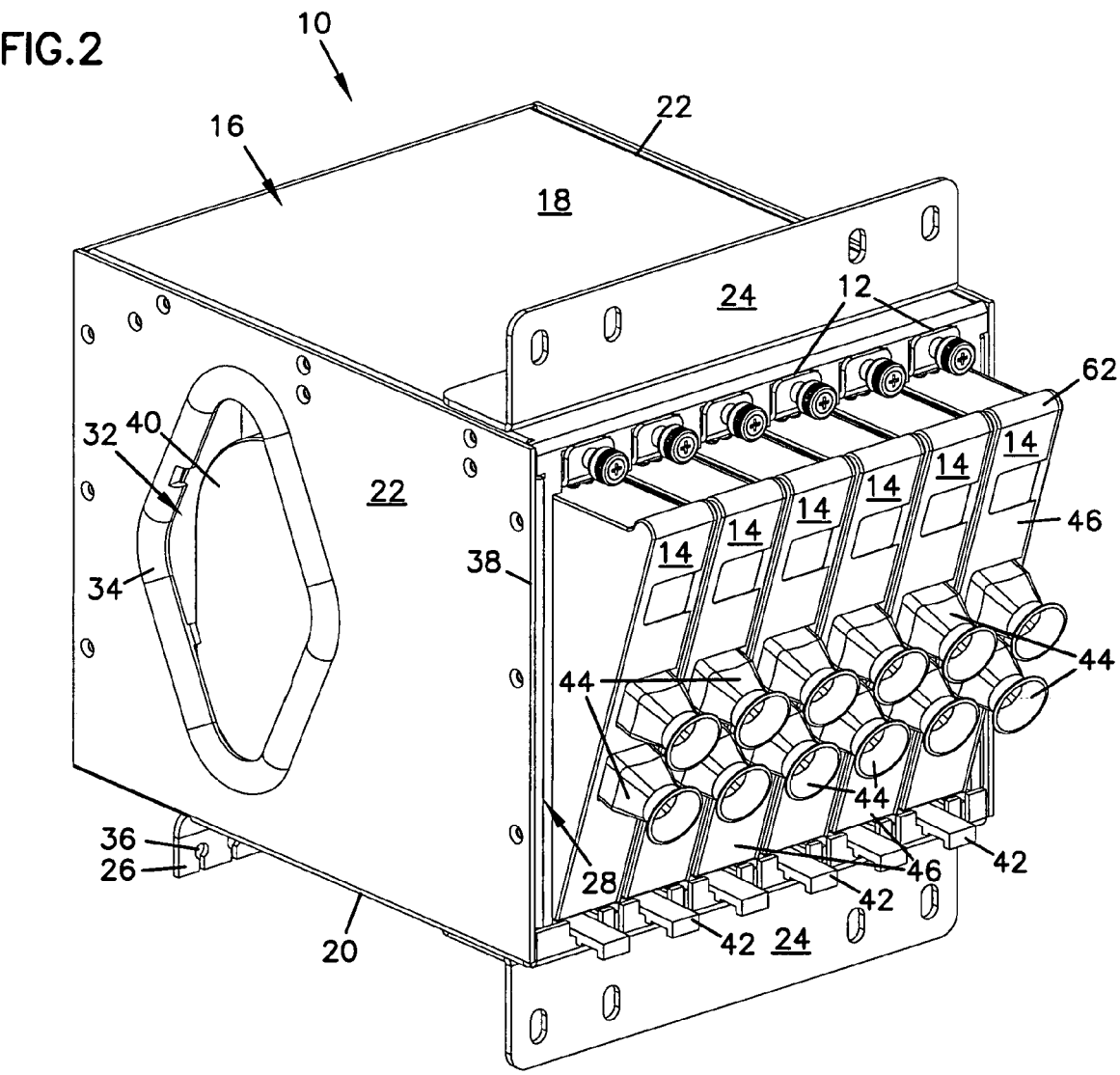
FIG. 2 is a front perspective of the telecommunications assembly of FIG. 1, taken from an opposite side.

Referring now to FIG. 2, each module 14 includes a releasably catch 42 adjacent second major side 20. As can be seen below in and described with to FIG. 10, catch 42 engages a portion of housing 16 to hold module 14 within front opening 28 and can also be deflected to permit withdrawal of module 14 from housing 16. Each module 14 also may include one or more cable exits 44 extending from a front face 46. Cable exits 44 permit telecommunications cables within module 14 to be directed outside of module 14, as will be described below with regard to FIG. 10. As shown in FIG. 2, front faces 46 of modules 14 are angled with regard to front opening 28, which may aid in the direction of cables exiting module 14 toward a desired location in the telecommunications installation. It is anticipated that front faces 46 could be made generally parallel to front edges 38 of transverse sides 22 at front opening 28 within the scope of the present disclosure.

Figure 3:
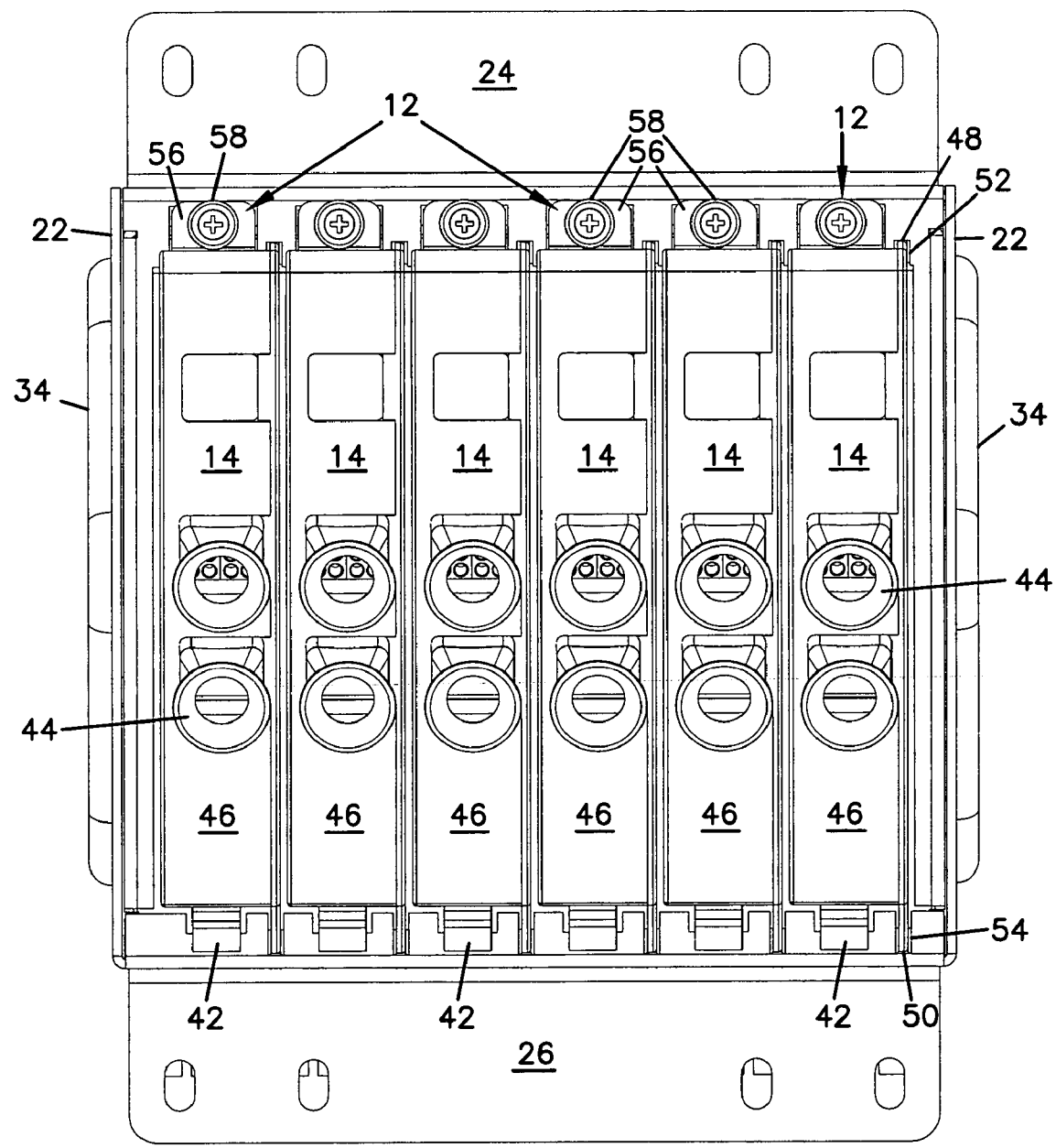
FIG. 3 is a front view of the telecommunications assembly of FIG. 1.

Referring now to FIG. 3, modules 14 includes unequal length flanges 48 and 50 which are received within correspondingly sized slots 52 and 54, respectively. Flange 48 and slot 52 are smaller in size than flange 50 and slot 54. Slot 52 is sized so that, while flange 48 may be received within slot 52, larger flange 50 will not fit. This ensures that modules 14 are positioned within front opening 28 in a particular desired orientation. Similar flanges are described in commonly-owned U.S. Pat. No. 5,363,465, the disclosure of which is incorporated herein by reference. Opposite latch 42 and mounted to housing 16 at each mounting location 12 are an adapter holder 56 releasably held within front opening 28 by a thumbscrew 58. Adapter holder 56 is described in further detail below with regard to FIGS. 9 to 16.

Figure 4:
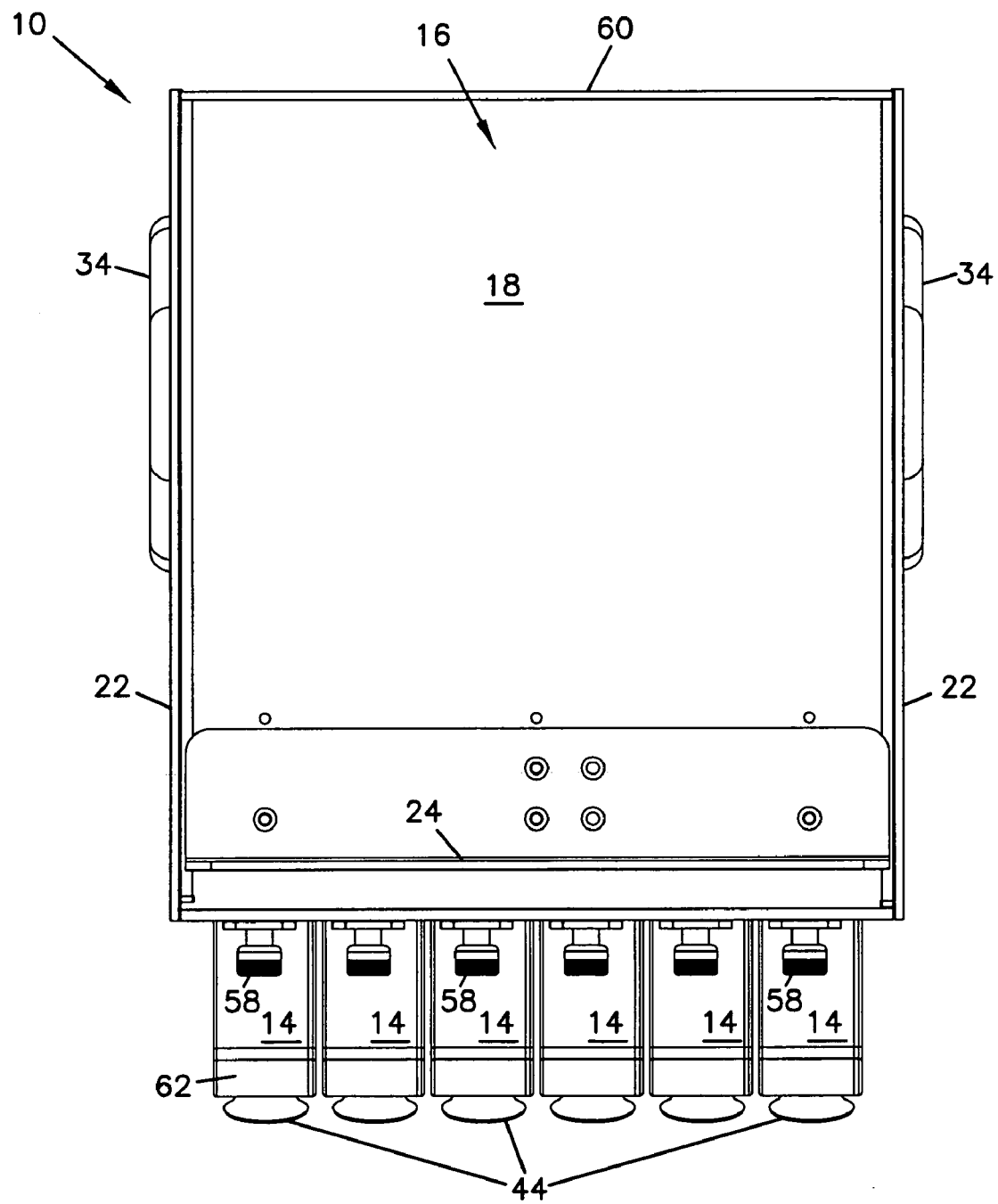
FIG. 4 is a top view of the telecommunications assembly of FIG. 1.
Figure 5:
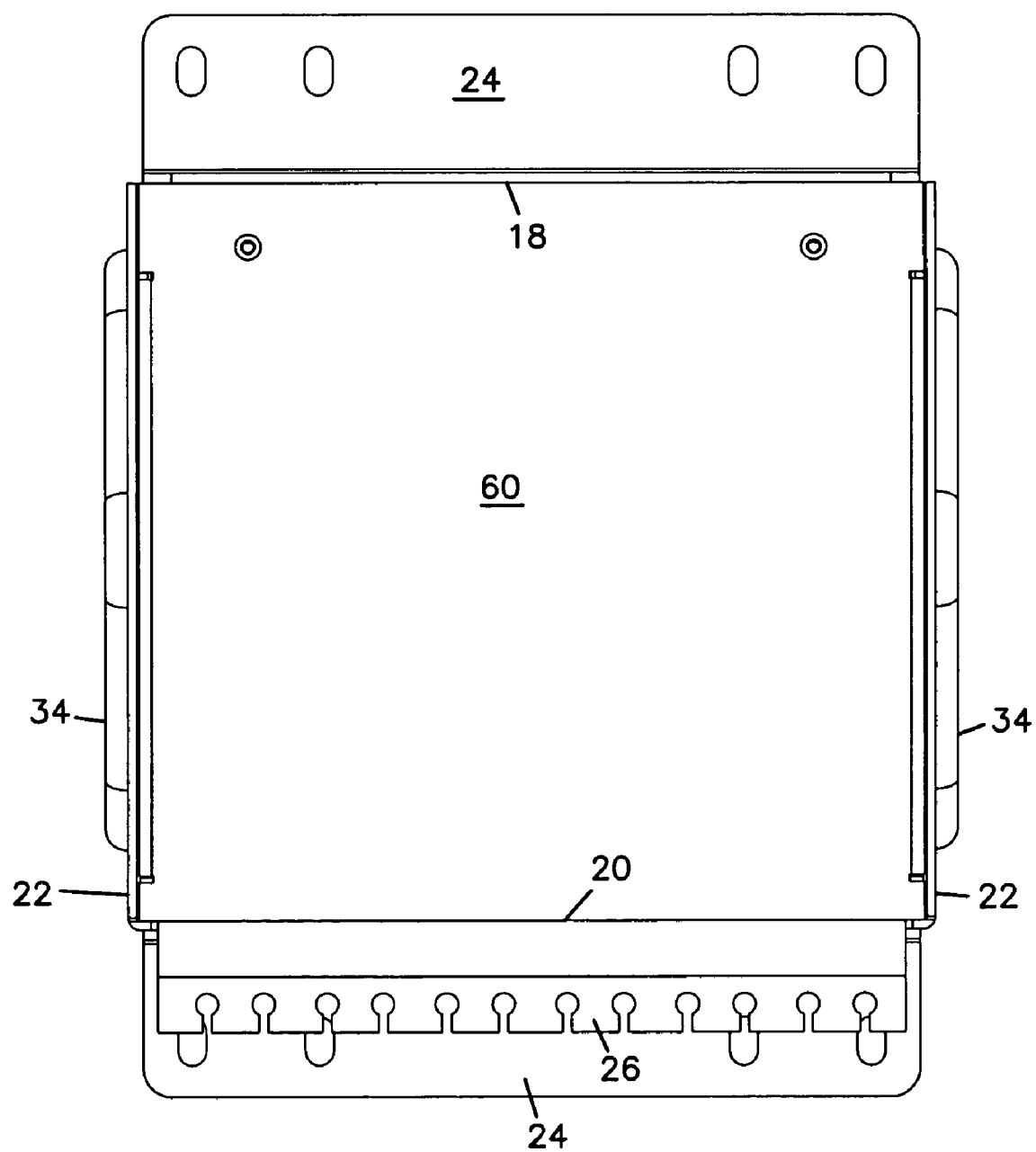
FIG. 5 is a rear view of the telecommunications assembly of FIG. 1.
Figure 6:
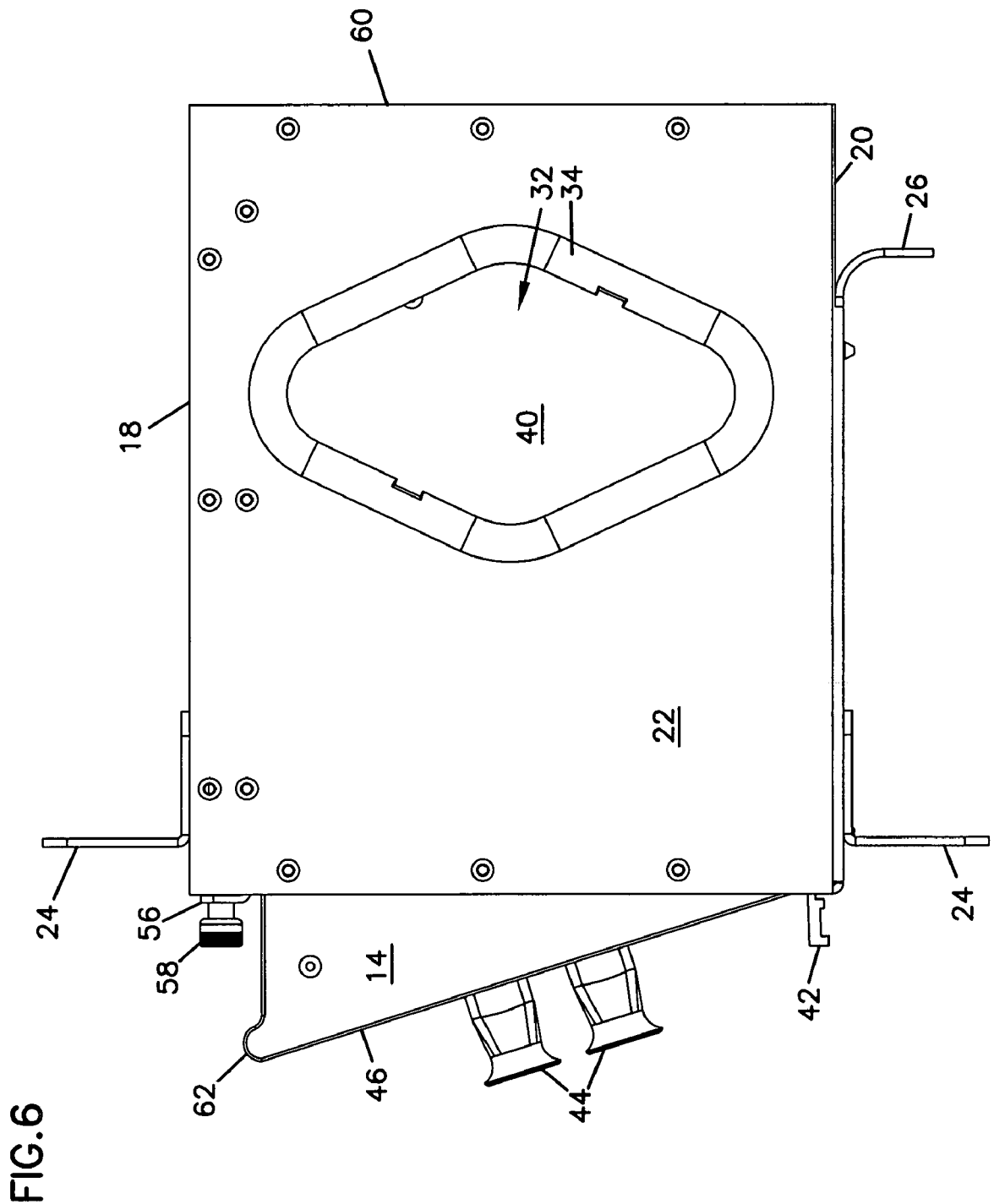
FIG. 6 is a side view of the telecommunications assembly of FIG. 1.

Referring now to FIGS. 4 and 5, housing 16 further includes a back 60 opposite front opening 28, substantially closing off the rear of housing 16. Openings may be provided through back 60 to allow cables or air to pass, but it is anticipated that user access into interior 30 of housing 16 will be made through front opening 28. As shown in FIG. 6, on one end of modules 14, a lip or finger grip 62 may be included to aid removal of module 14 from housing 16. Finger grip 62 is preferably positioned on module 14 opposite latch 42 so that a user may apply opposing force with fingers or hands to securely grasp the module and remove it from housing 16.

Figure 7:
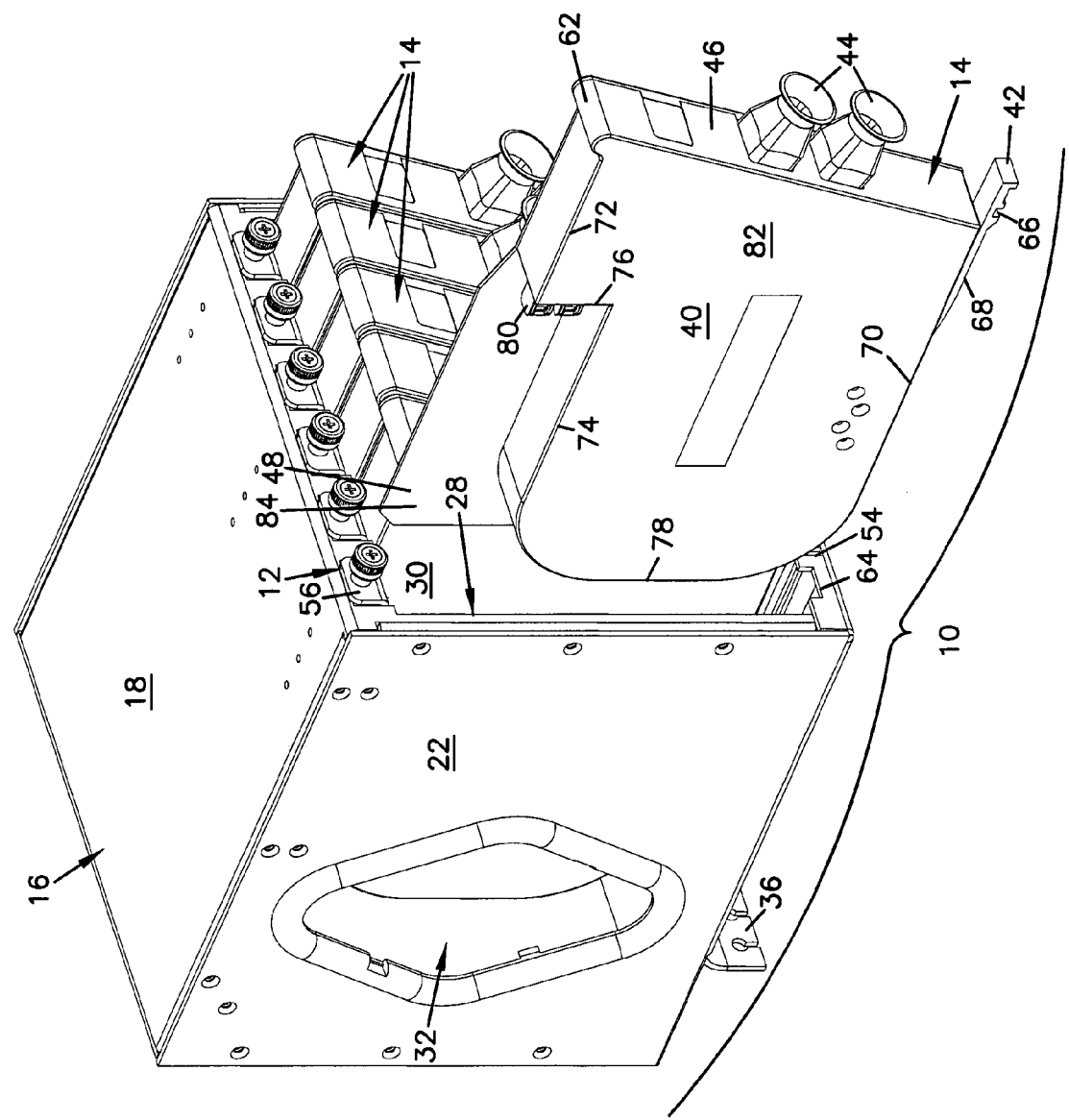
FIG. 7 is a front perspective view of the telecommunications assembly of FIG. 1, with one of the modules exploded out of the assembly and mounting flanges removed from the upper and lower surfaces of the chassis.

Referring now to FIG. 7, latch 42 of module 14 includes a recessed area 66 which engages an edge 64 of mounting location 12 to hold module 14 in place within front opening 28. Recessed area 66 is formed near a distal end of latch 42 and a flexible portion 68 extends from recessed area 66 to a point of connection to a first side 70 of module 14. Flexible portion 68 is resiliently deformable and allows a user to deflect latch 42 to disengage recessed area 66 from edge 64 and remove module 14 from housing 16 or for latch 42 to deflect as module 14 is inserted into front opening 28 and engage edge 64. Module 14 includes a second opposing side 72 and a back 78. An intermediate rear face 76 is formed in second side 72 by an inset side portion 74. A pair of fiber optic connectors 80 is positioned in rear face 76 to mate with fiber optic adapters mounted to adapter holder 56 within interior 30 of housing 16.

Figure 8:
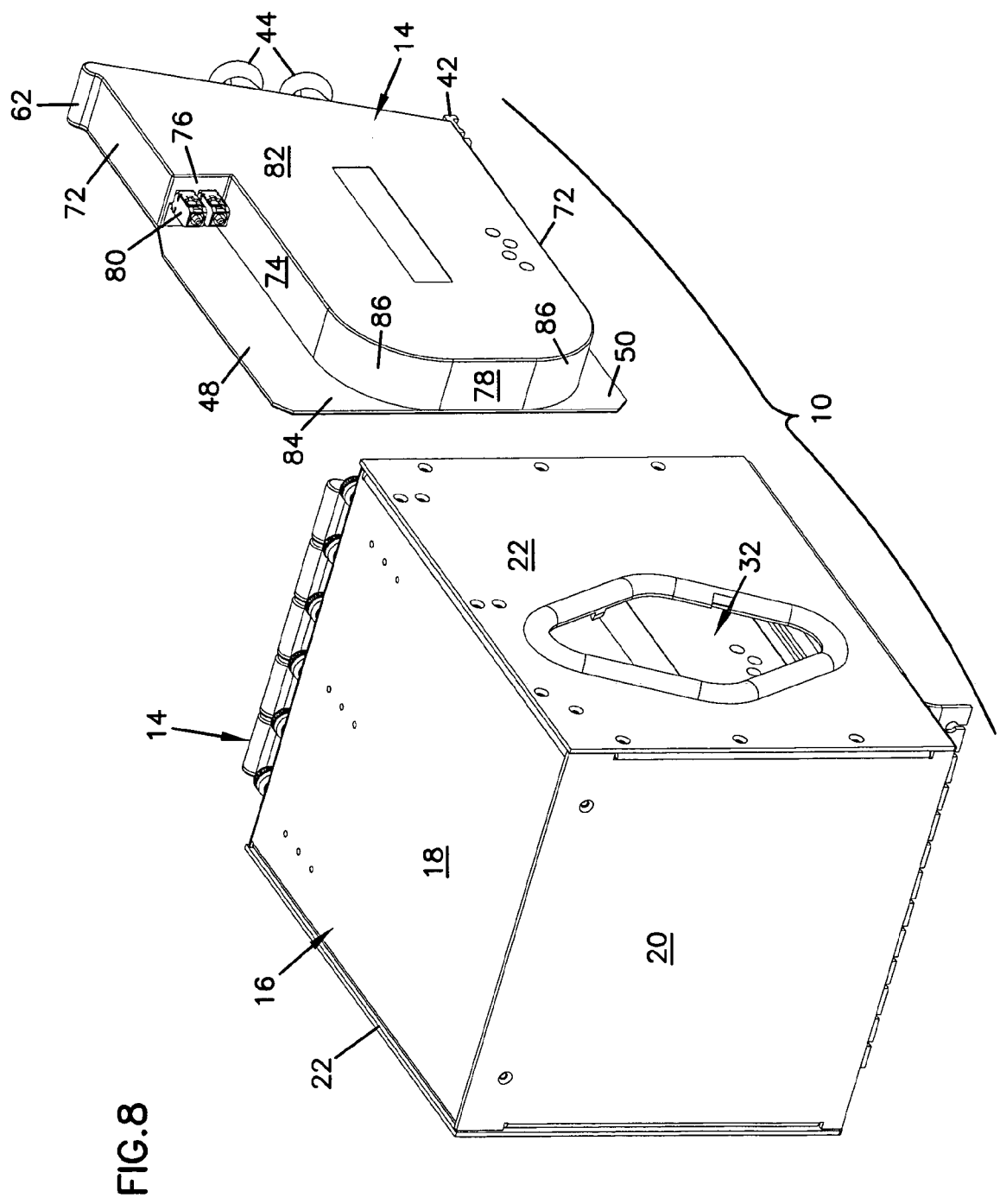
FIG. 8 is a rear perspective view of the telecommunications assembly of FIG. 7.

Module housing 40 also includes a first transverse face 82 extending between first side 70, second side 72, back 78 and front face 46. A second transverse face 84 closes off the opposite side of module housing 40 between front face 46 and back 78 but extends beyond sides 70 and 72 to form flanges 48 and 50 (flange 50 is not visible in FIG. 7). In FIG. 8, flange 50 is visible as an extension of second transverse face 84 beyond side 70 of module 14. Module housing 40 may include curved transitions 86 between sides 70 and 72 and back 78. Transitions 86 may be shaped to provide bend radius protection to cables within interior 30 as the cables extend to adapters 88. Alternatively, sides 70 and 72 may terminate directly at back 78, depending on the needs for placing components within module housing 40 and efficiencies in manufacturing of module housing 40.

Figure 9:
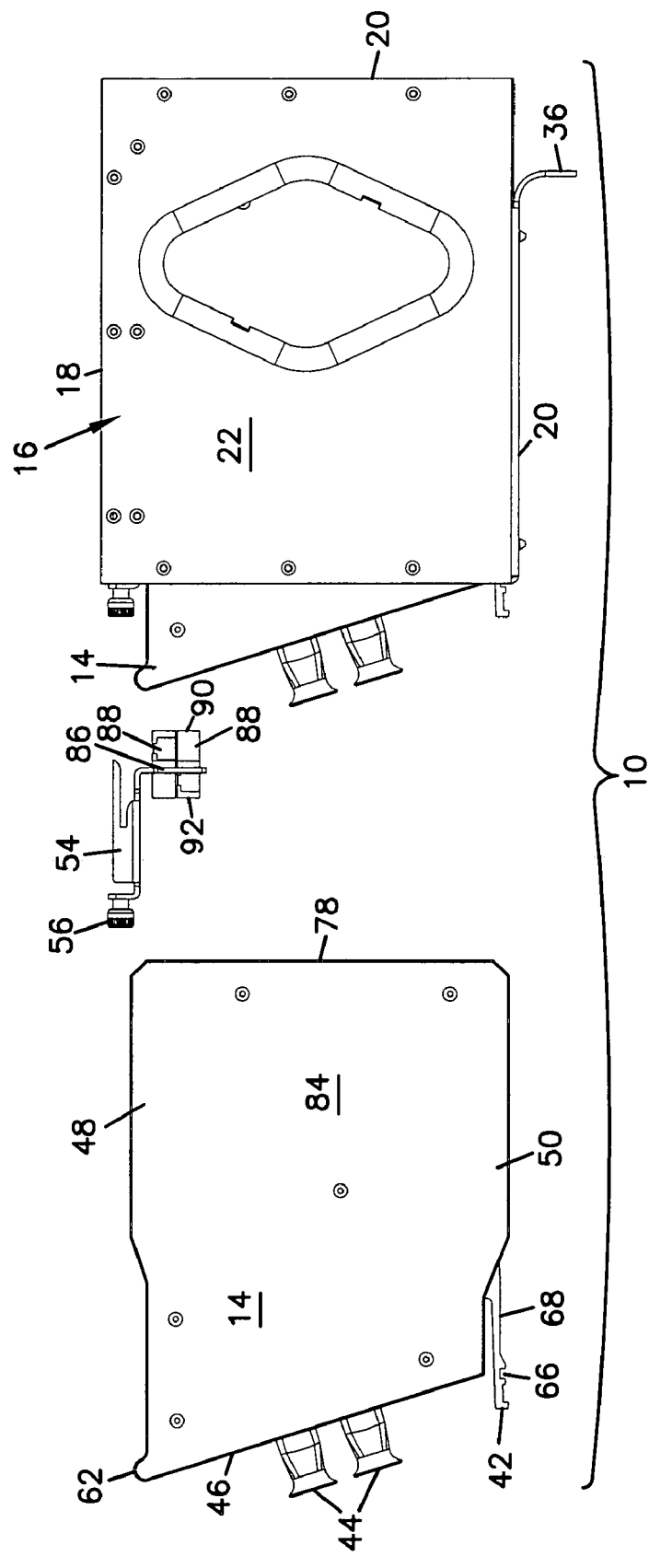
FIG. 9 is a side view of the telecommunications assembly of FIG. 7, with a fiber optic adapter holder exploded out of the assembly.

FIG. 9 shows assembly 10 with adapter holder 54 exploded out from interior 30. Holder 54 includes an extension 86 to hold and position a pair of adapters 88 to engage connectors 80 of module 14. Each adapter 88 includes a first or rear end 90 and a second or front end 92, and each of the first and second ends are adapted to receive a fiber optic connector which may terminate a fiber optic cable.

Figure 10:
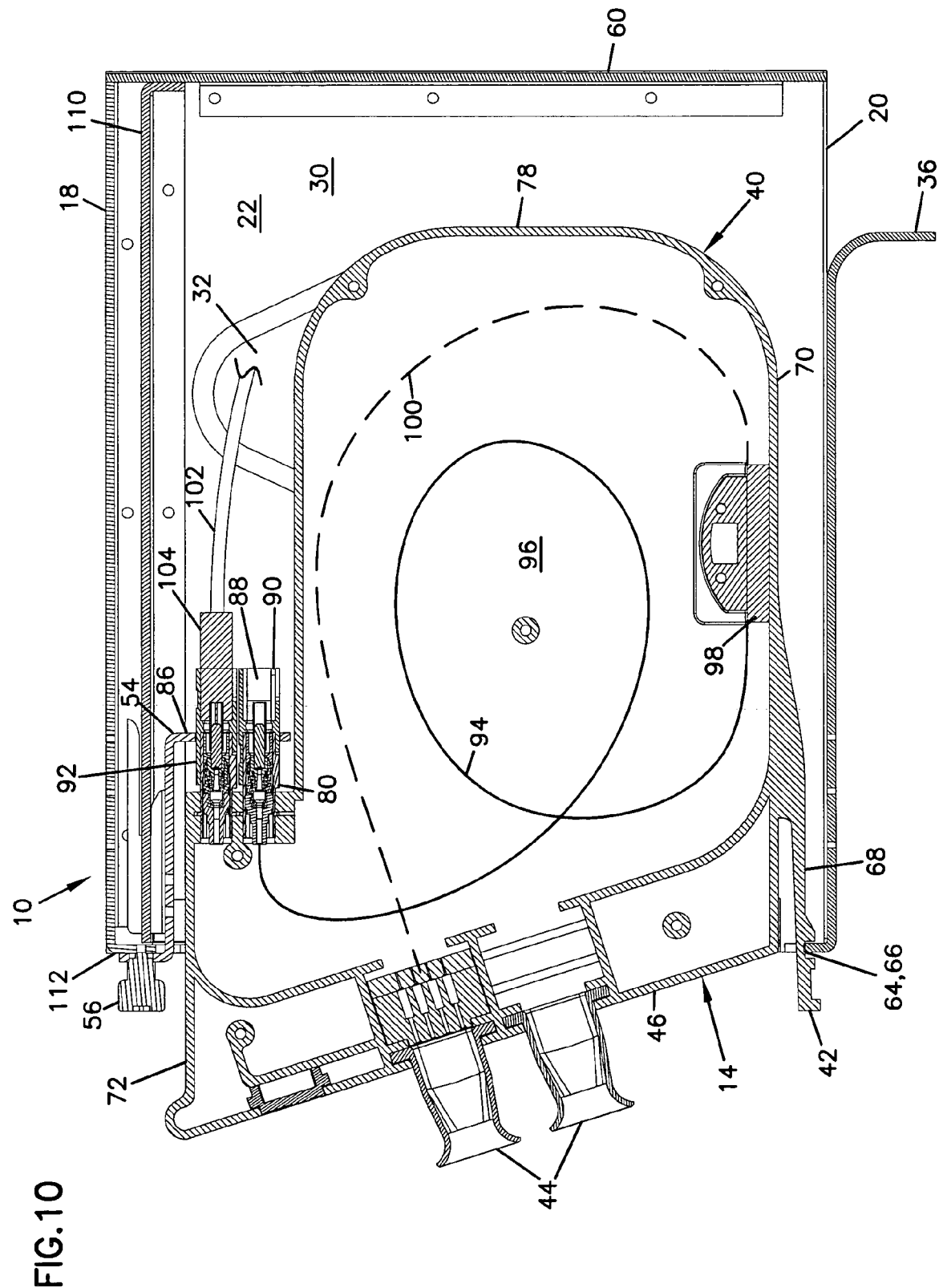
FIG. 10 is a side cross-sectional view of the telecommunications assembly of FIG. 1, taken through the center of one of the modules mounted within the assembly.

FIG. 10 shows a cross-section of assembly 10 with a first cable 94 extending from connector 80 to an optical component 98, mounted within an interior 96 of module housing 40. Optical component 98 may be a splitter or a fan-out or another type of optically significant element. First cable 94 may be a multi-strand fiber cable with a plurality of strands of optical fiber and optical component 98 may be a fanout to separate the individual strands into each of a plurality of second cables 100. Second cables 100 extend from optical component 98 to cable exit 44. Alternatively, first cable 94 may be a single fiber whose signal is separated by optical component 98 which is a splitter and a plurality of second cables 100 carrying portions of the signal from first cable 94 may extend to cable exit 44. The arrangement of optical fiber and sheathing at cable exit 44 may be as disclosed in commonly-owned U.S. patent application Ser. No. 10/658,802, the disclosure of which is incorporated herein by reference.

An outside cable 102 may extend to rear end 90 of adapter 88 and be terminated by a connector 104. Connector 104 may be received in rear end 90 to be optically connected to connector 80 of module 14. Cable 102 may extend from interior 30 of housing 16 through an opening in one of sides 18, 20, or 22 in housing 16.

Figure 11:
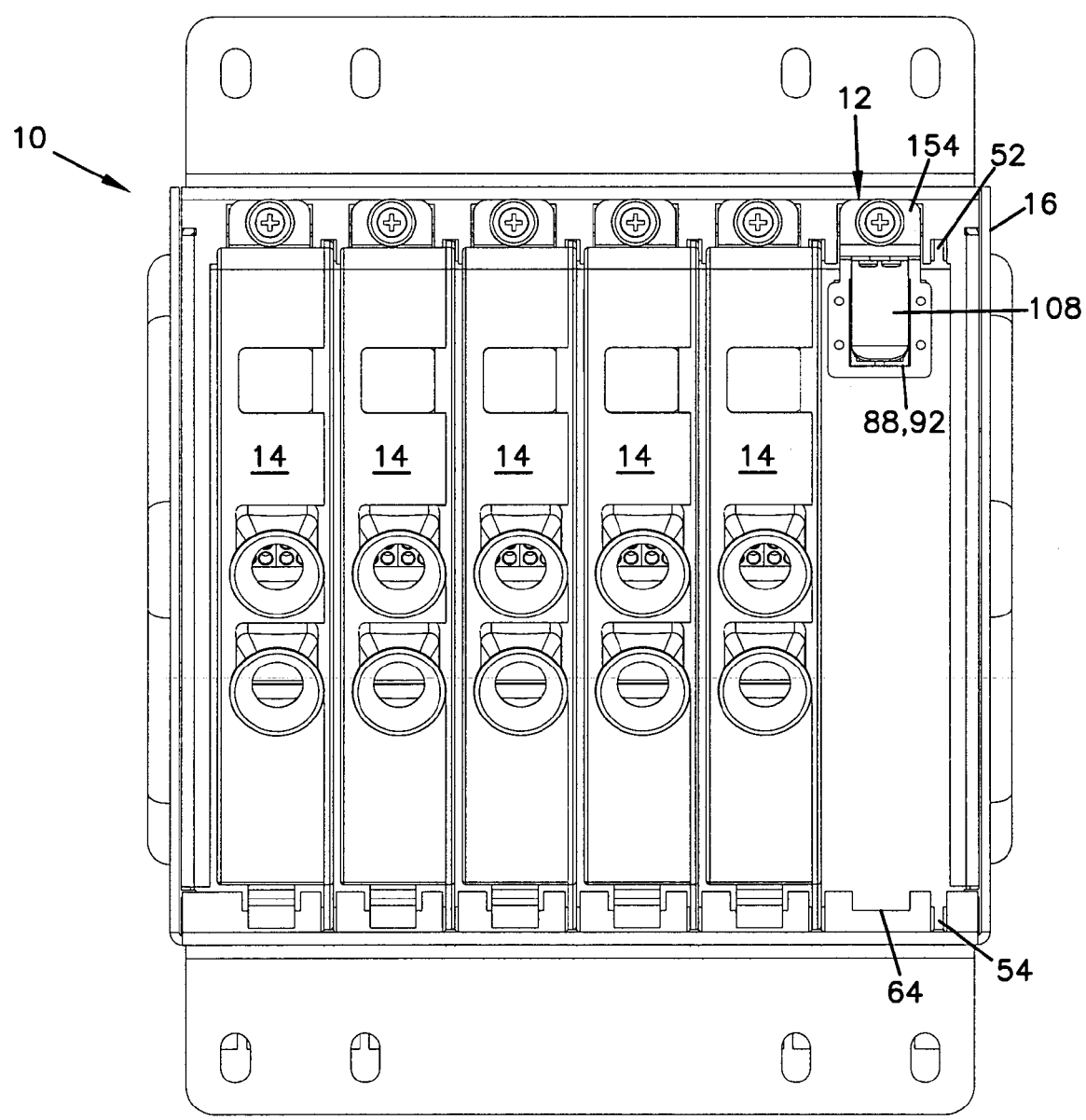
FIG. 11 is a front view of the telecommunications assembly of FIG. 1, with one of the modules removed to show the adapter holder mounted within the interior of the assembly.

Referring now to FIG. 11, assembly 10 has a module removed from one of the mounting locations 12 and includes an alternative adapter holder 154 in that mounting location 12. Holder 154 includes a shield 108 in front of second ends 92 of adapters 88. In some installations, a housing 16 may be installed and a cable 102 led to and connected to first ends 90 of adapters 88, before a module 14 is placed in the associated mounting location 12. If cable 102 is illuminated and transmitting light signals, shield 108 will prevent accidental exposure to these signals which might damage eyes or other sensitive organs, or nearby communications equipment.

Figure 12:
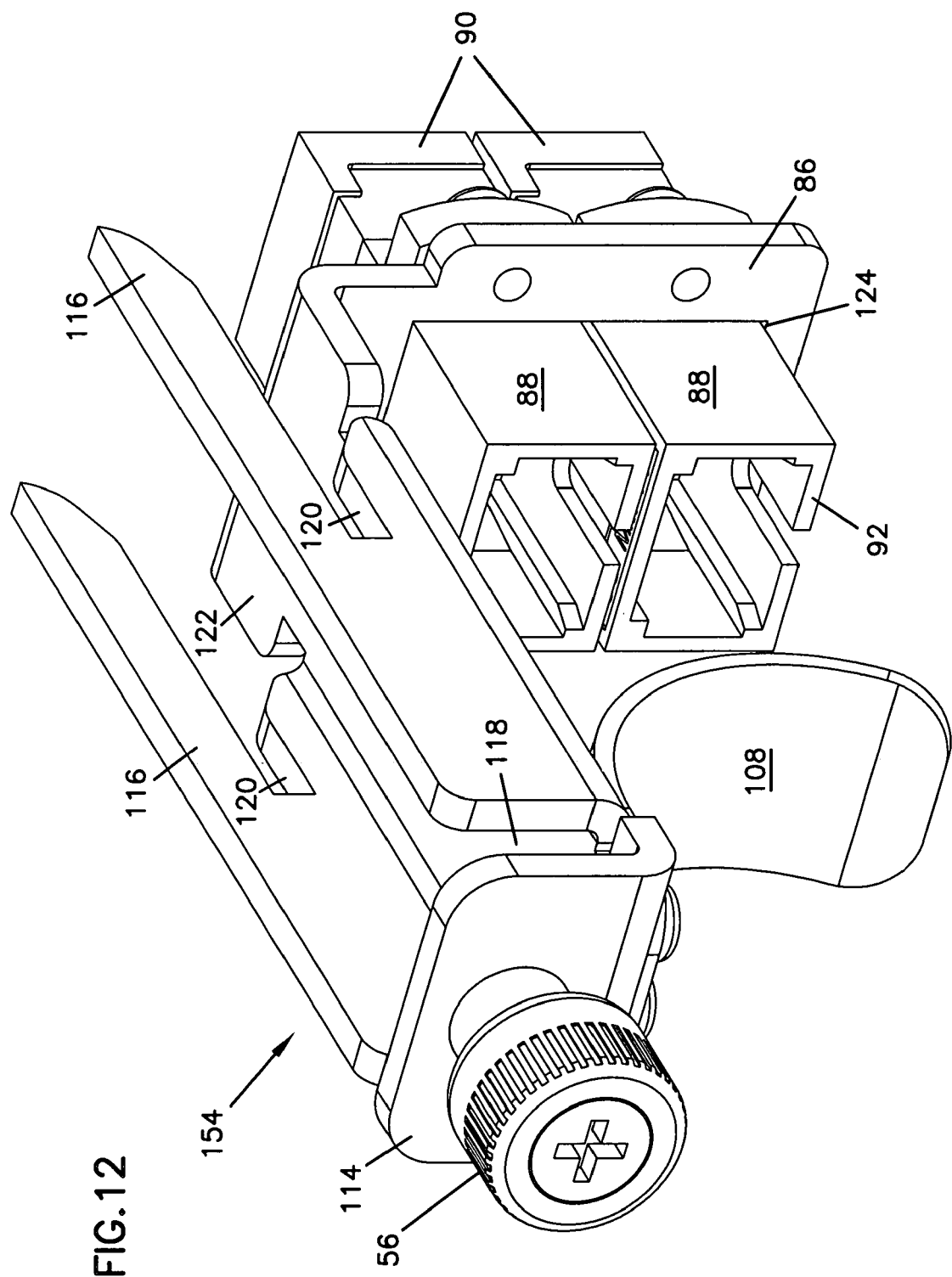
FIG. 12 is a front perspective view of the adapter holder of FIG. 11, removed from the assembly.
Figure 14:
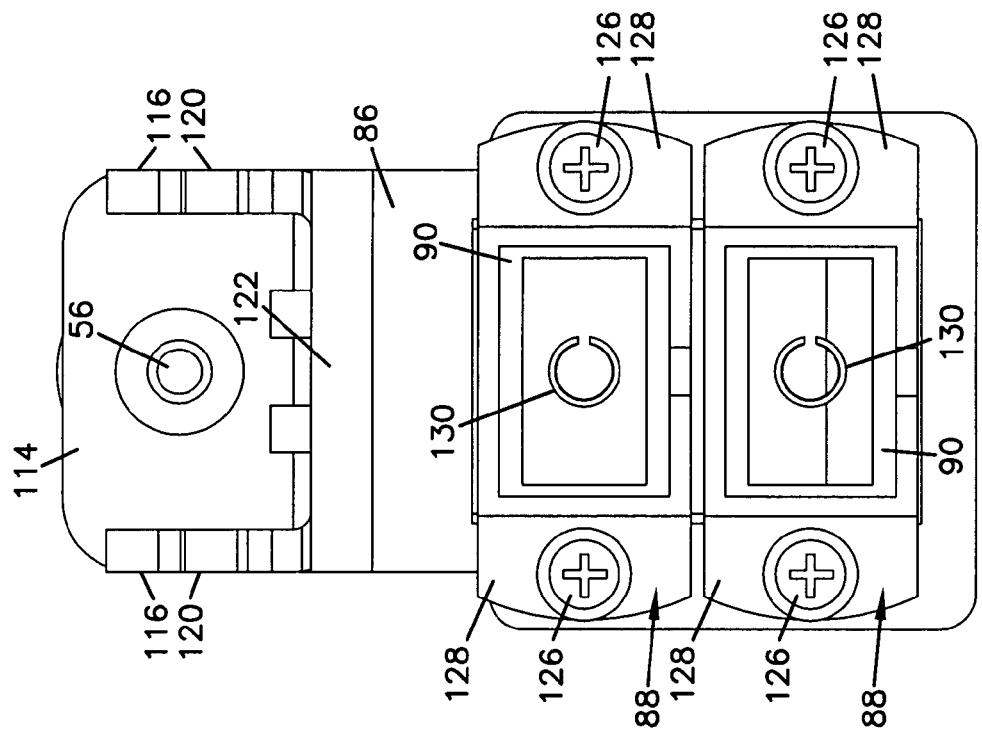
FIG. 14 is a rear view of the adapter holder of FIG. 12.
Figure 13:
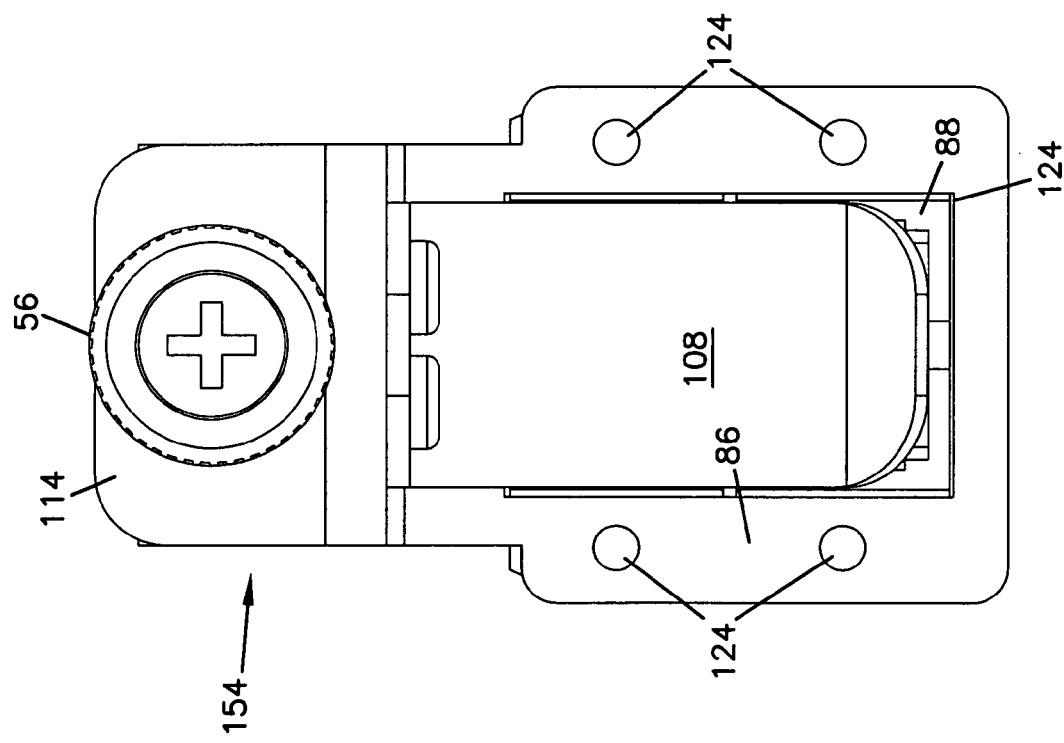
FIG. 13 is a front view of the adapter holder of FIG. 12.

In FIG. 12, holder 154 includes an opening 124 through extension 86 through which adapters 88 are mounted. Thumbscrew 56 extends through a front flange 114 and pair of wall engaging flanges 116 extend backward from adjacent front flange 114. Alternatively, other releasable features, such as snap fit devices, quarter turn fasteners, swell latches or similar features may be used in place of thumbscrew 56 on holder 54 or 154. Positioned between a forward end of each flange 116 and front flange 114 is a slot 118. Toward a rear end of flanges 116 are a pair of wall slots 120. As shown in FIG. 10, an inner wall 110 is positioned within interior 30 offset inwardly from first major surface 18. Wall slots 120 extend along both sides of inner wall 110. A turned-in forward edge 112 of first major surface 18 engages slot 118. These engagements between housing 16 and holder 154 correctly position adapters offset from inner wall 110 within interior 30 to engage connector 80 on rear face 76 of module 14. A central member 122 extends from front flange 114 between wall flanges 116 to extension 86 to correctly position adapters 88 within interior 30 between front opening 28 and rear 60.

Referring now to FIGS. 13 to 16, extension 86 of holder 154 includes a plurality of fastener openings 124 for mounting adapters 88 to extension 86. Fasteners 126 may be extended through side flanges 128 of adapter 88 to permit secure mounting of adapters 88. Adapters 88 are shown as SC style connectors, although other types, styles and formats of adapters may be used within the scope of the present disclosure and connectors 80 and 104 changed to mate with these alternative adapters. Within each of the adapters 88 shown may be an alignment device, such as a split sleeve 130 to correctly position optical fiber terminated in a ferrule and held by connectors 80 and 104. Such alignment devices and termination ferrules are well known in the art.

Shield 108 is curved when viewed from the side, as in FIG. 15, so that shield 108 will be deflected by module 14 as module 14 is inserted into interior 30 through front opening 28 so that connectors 80 can mate with adapters 88. Shield 108 is preferably made of a resilient deformable material that will return to the position shown in FIG. 15 4 when the module 14 is withdrawn from mounting location 12. Shield 108 may be connected to central member 122 by a pair of fasteners such as screws 132. Alternatively, shield 108 could be connected to holder 154 by being formed integrally with holder 154 or by spot-welding or other fastening techniques. As rear 60 closes off the rear of housing 16 so that is no access to the rear any modules 14 mounted at a mounting location 12, providing a second shield 108 to block light from first end 90 of each adapter 88 is not needed as shown. However, if any sensitive equipment is mounted within module 14 or housing 16, it may be desirable to have a second shield 108 blocking first side 90 of adapters 88.

Insertion of module 14 into housing 16 at one of the mounting locations 12 may include first unfastening thumbscrew 56 and removing holder 54 or 154 from interior 30 through front opening 28. Cable 102 preferably includes enough excess length or slack within interior 30 to permit adapters 88 to be pulled through opening 28. Once positioned outside of interior 30, connector 104 of cable 102 can be removed from first end 90 of adapter 88 to permit a polished endface of an optical fiber within cable 102 to be cleaned. Connector 104 can then be reinserted within first end 90. Holder 54 or 154 can be reinserted within interior 30 so that the holder engages inner wall 110 and inward turned extension 112 and thumbscrew 56 resecured. Insertion of module 14 into front opening 28 begins the mating of module 14 to housing 16 and adapters 88. Flanges 48 and 50 engage slots 52 and 54, respectively, as module 14 is inserted. Connectors 80 and portions of second side 72 engage and deflect shield 108 (if present) as connectors 80 approach second ends 92 of adapters 88. Further insertion of module 14 brings connectors 80 into and contact with adapters 88 and the connectors are received within second ends 92. Latch 42 is deflected inward as module 14 is inserted and then springs back so that recessed area 66 engages edge 64. Module 14 is now mounted within front opening 28 and interior 30 at mounting location 12 and in position to process and transmit signals from cable 102 through first cable 94, optical component 98 and second cable 100 within module interior 96.

Figure 17:
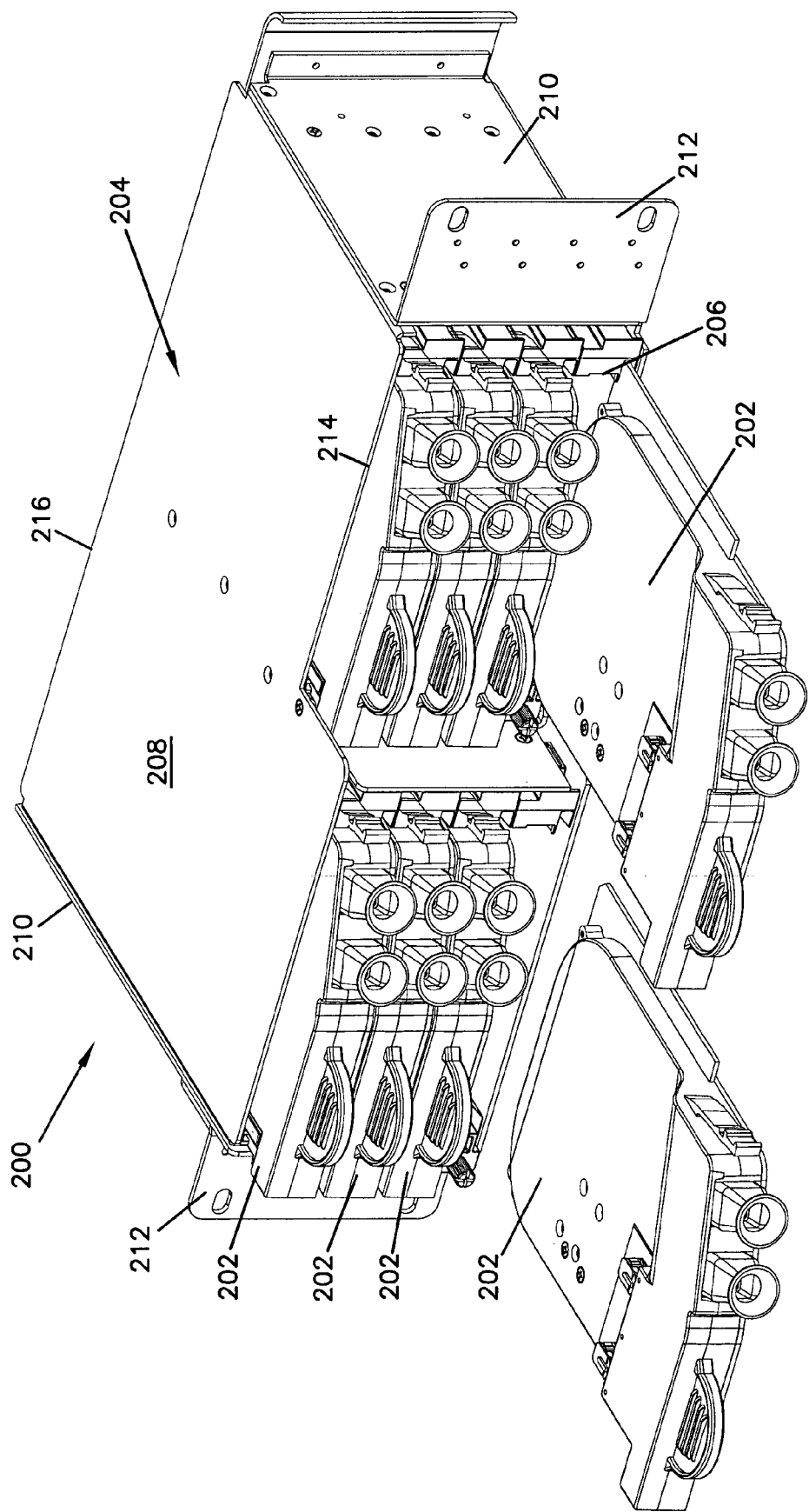
FIG. 17 is a front perspective view of an alternative telecommunications assembly according to the present invention, with a plurality of fiber optic splitter modules mounted within a chassis and two modules exploded from their mounted positions.
Figure 18:
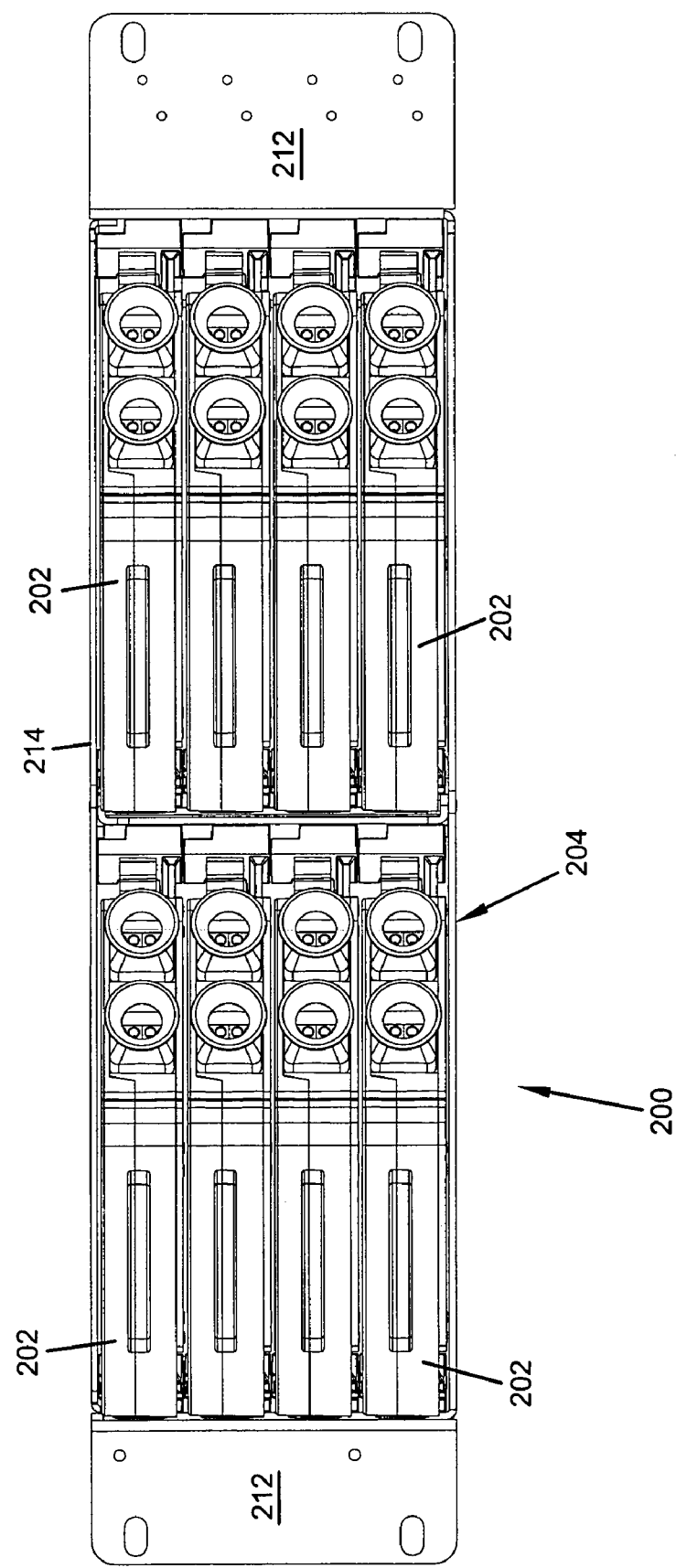
FIG. 18 is a front view of the telecommunications assembly of FIG. 17.
Figure 19:
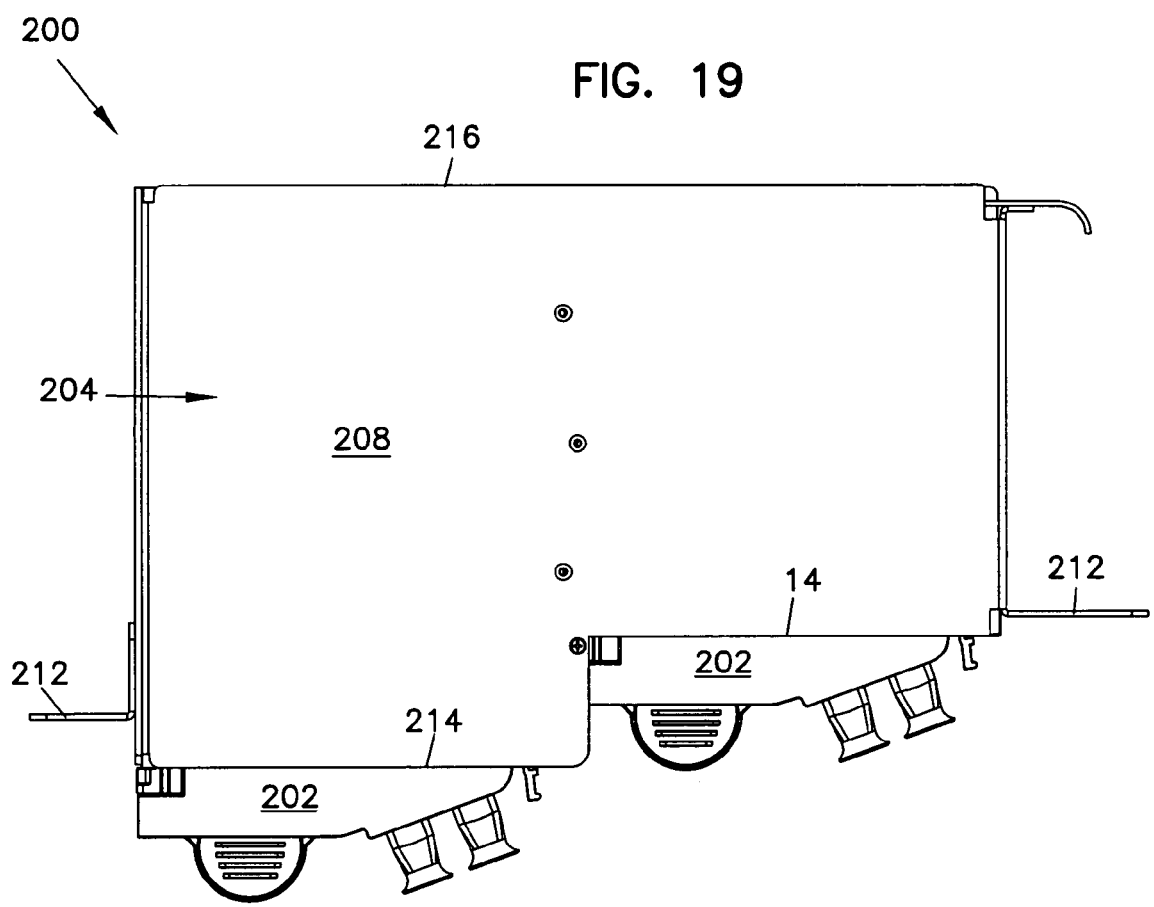
FIG. 19 is a top view of the telecommunications assembly of FIG. 17.
Figure 20:
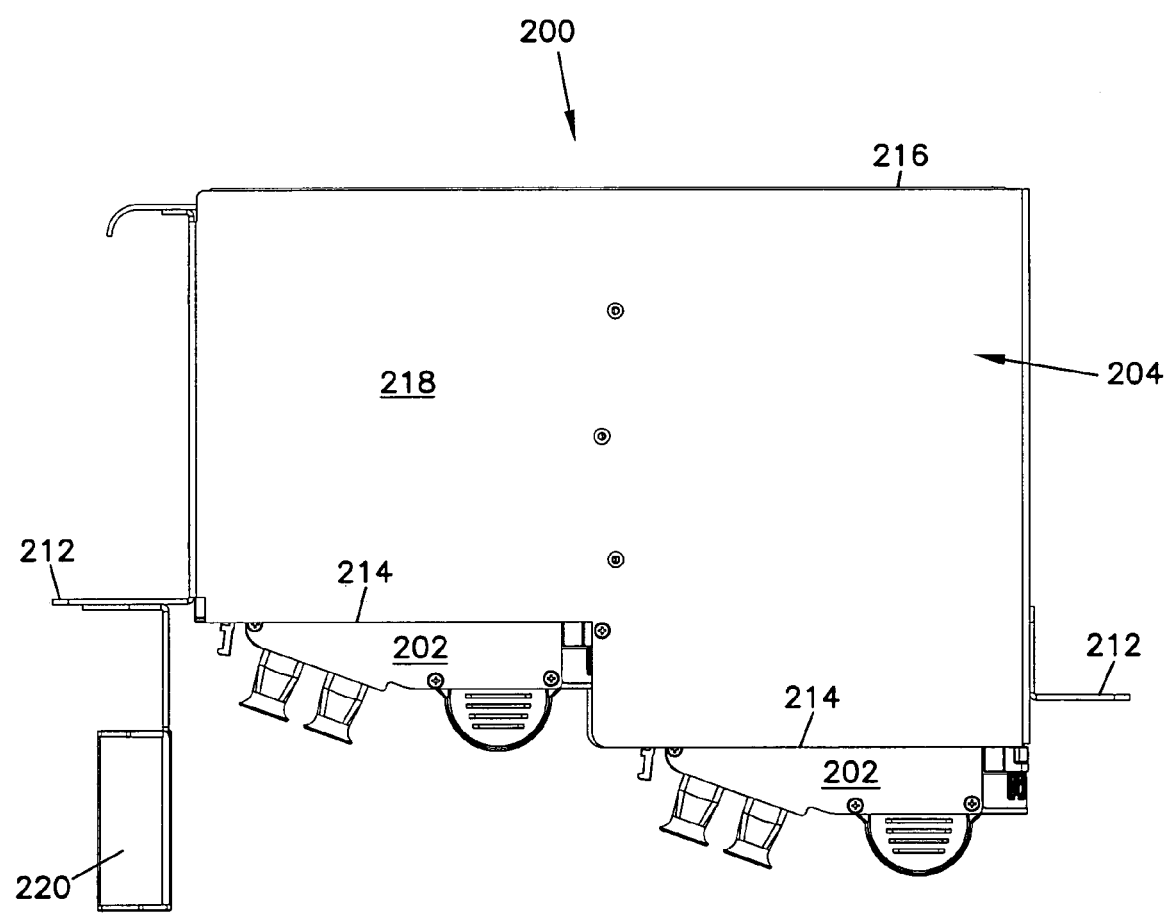
FIG. 20 is a bottom view of the telecommunications assembly of FIG. 17, with a cable management structure mounted adjacent one side of the chassis.

Referring now to FIGS. 17 to 19, an alternative embodiment 200 of a telecommunications assembly includes a plurality of fiber optic splitter modules 202 mounted in mounting locations 206 in a front 214 of chassis 204. Chassis 204 includes a top 208, a pair of opposing sides 210 and a pair of mounting flanges extending outward from sides 210 adjacent front 214. Chassis 204 also includes a rear 216. Front 214 defines a pair vertical stacks of mounting locations 206 which are offset front to rear from each other to provide improved cable pathways for fiber optic cables extending from modules 202.

Figure 21:
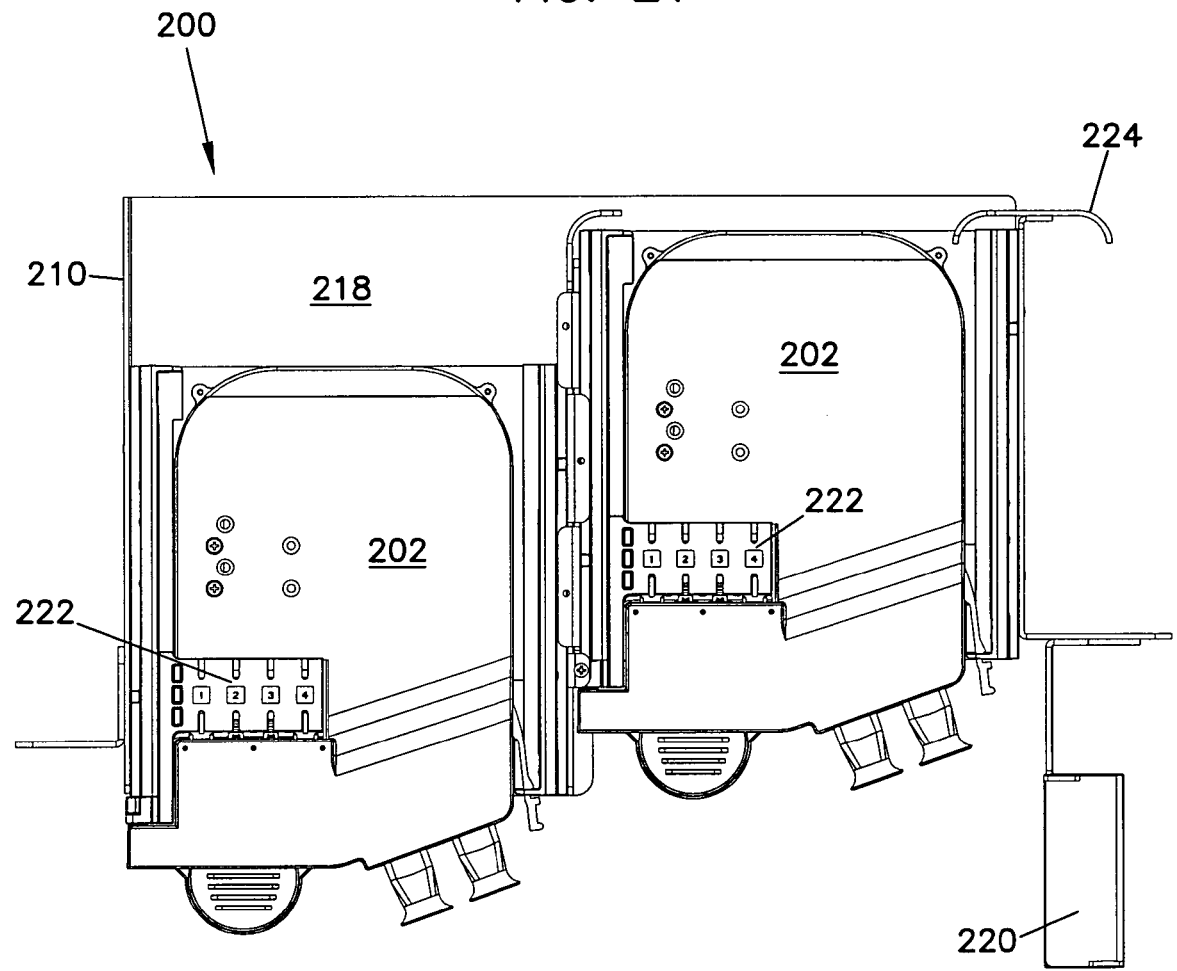
FIG. 21 is a top view of the telecommunications assembly of FIG. 20, with a top of the chassis removed.
Figure 22:
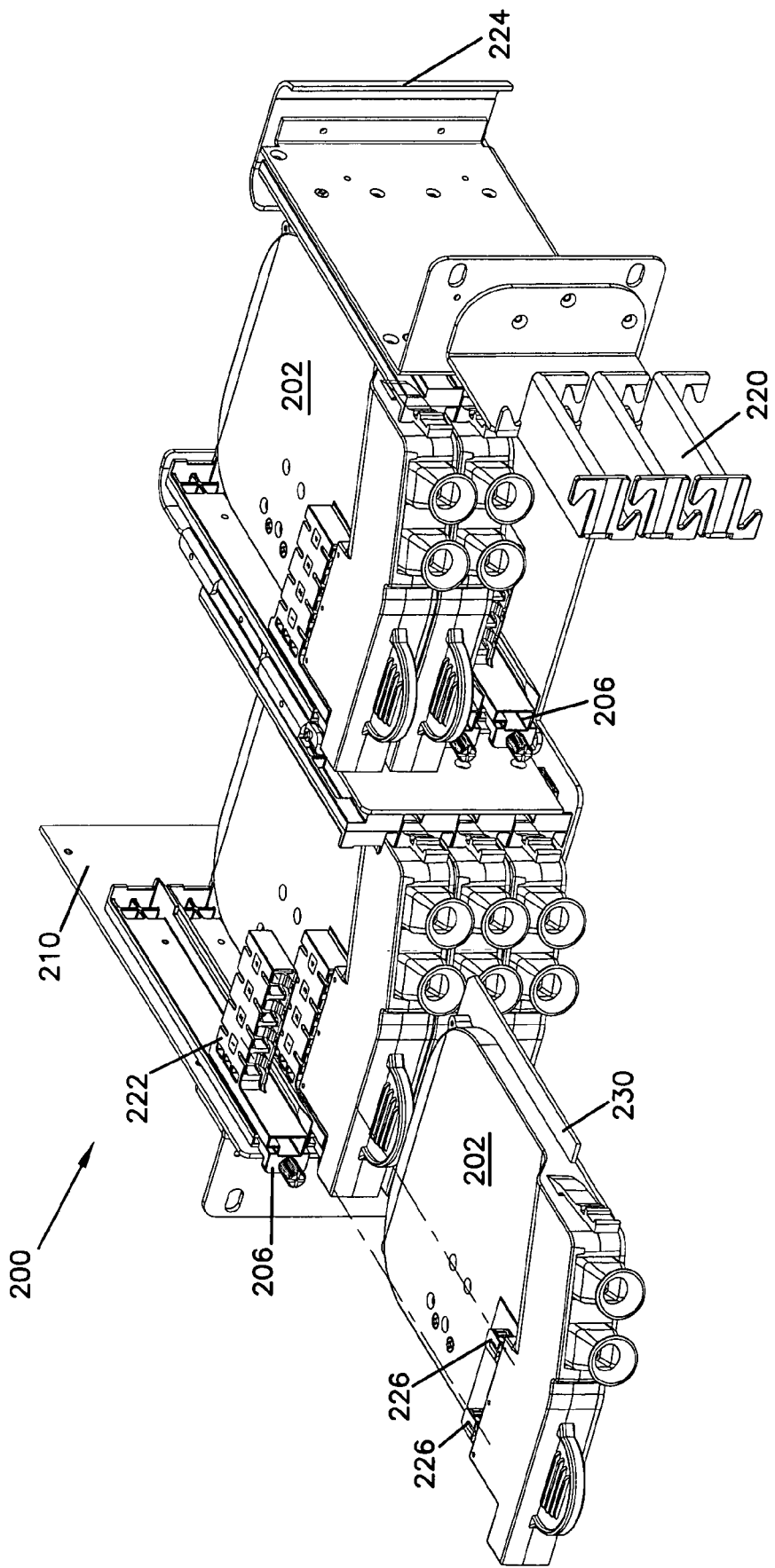
FIG. 22 is a front perspective view of the telecommunications assembly of FIG. 21, with one of the modules exploded from its mounting position within the chassis.
Figure 28:
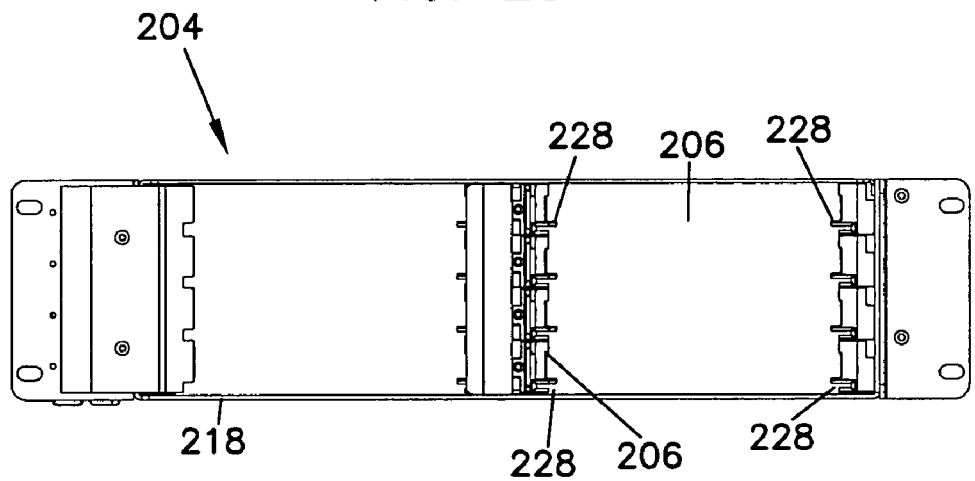
FIG. 28 is a rear view of the chassis of FIG. 27.
Figure 27:
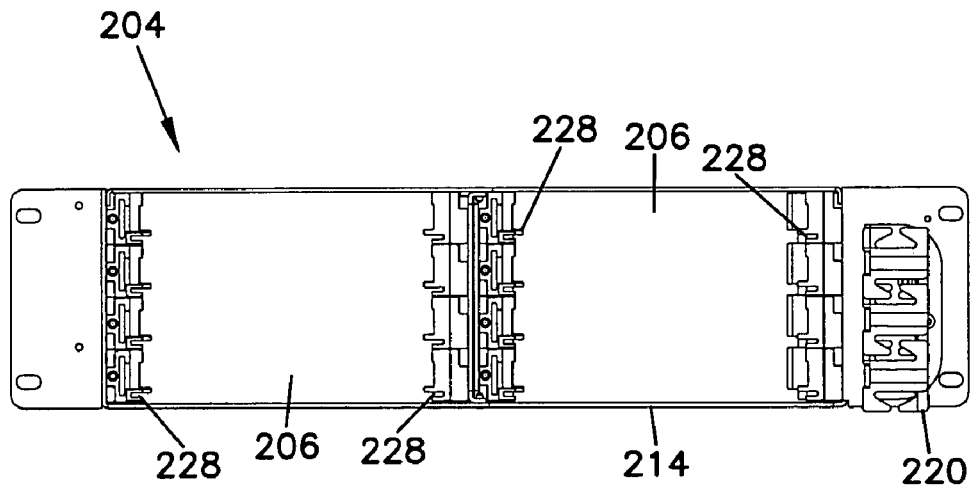
FIG. 27 is a front view of the chassis of the telecommunications assembly of FIG. 25, with the modules and adapter assemblies removed from within the chassis.

FIGS. 20 to 26 illustrate assembly 200 with a cable management structure 220 mounted to one of the mounting flanges 212 and a bottom 218. Two of the modules 202 have been removed from mounting locations 206. Referring now specifically to FIGS. 21 and 22, each module 202 includes up to four rear facing connectors 226 which are received within an adapter assembly 222 positioned at each mounting location 206. As shown, rear 218 of chassis 204 is open for entry of fiber optic cables extending to a rear side of adapter assembly 222 and a rear cable protector is mounted adjacent rear 218 to assist direction of these rear entering cables to adapter assembly 222. Each adapter assembly 222 includes up to four fiber optic adapters 232 which are configured to receive one of the rear facing connectors 226 in a front end and connector of a rear entering fiber optic cable in the opposite end.

Referring now also to FIGS. 27 to 31, each mounting location 206 includes a pair of opposing slots 228 when engage flanges 230 extending from sides of modules 202 to positions connectors 226 of modules 202 to engage adapter assembly 222.

Figure 32:
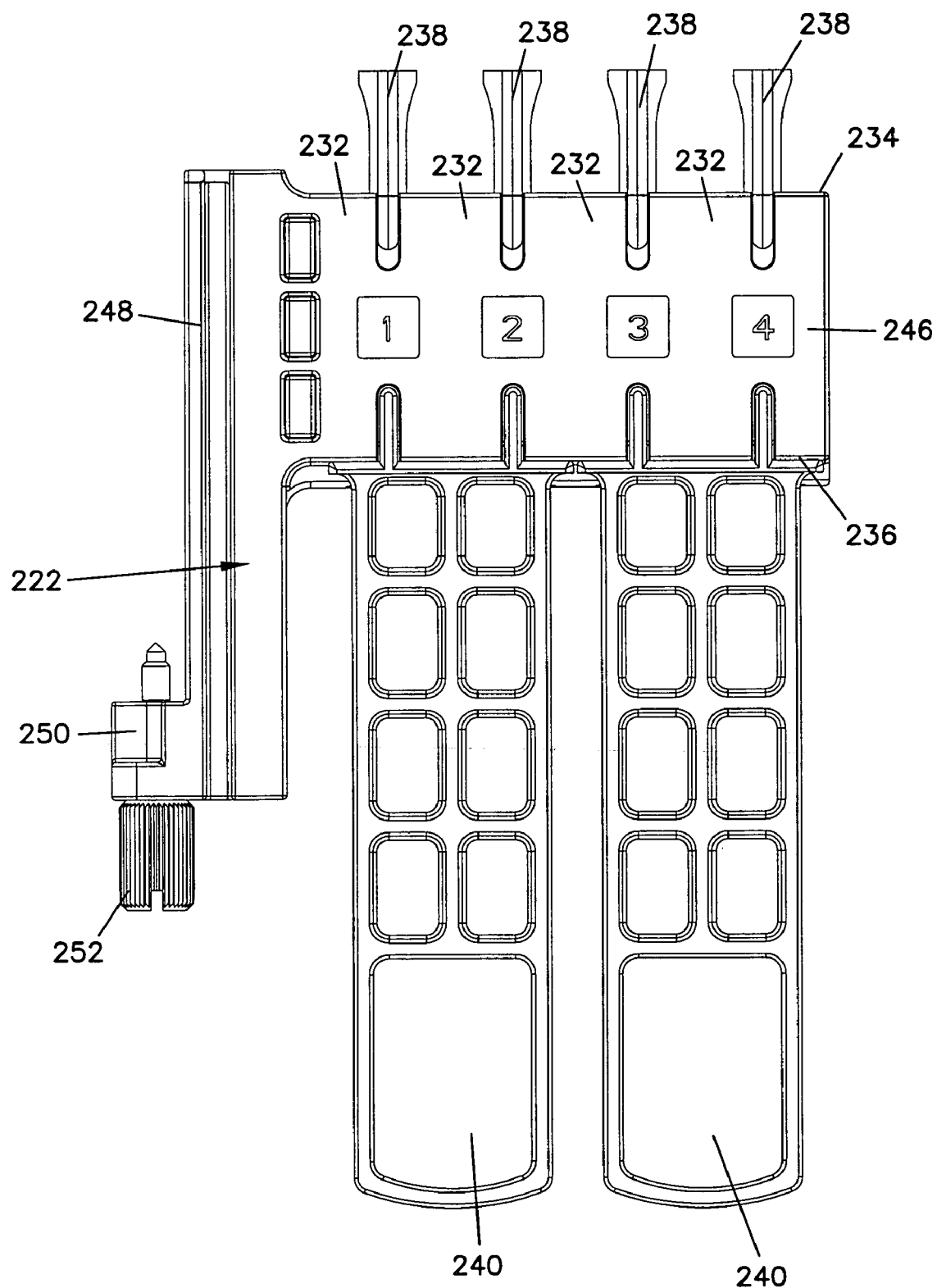
FIG. 32 is a top view of an adapter assembly according to the present invention with extended dust plugs inserted a front end of each adapter and standard duct plugs inserted within a rear end of each adapter.
Figure 33:
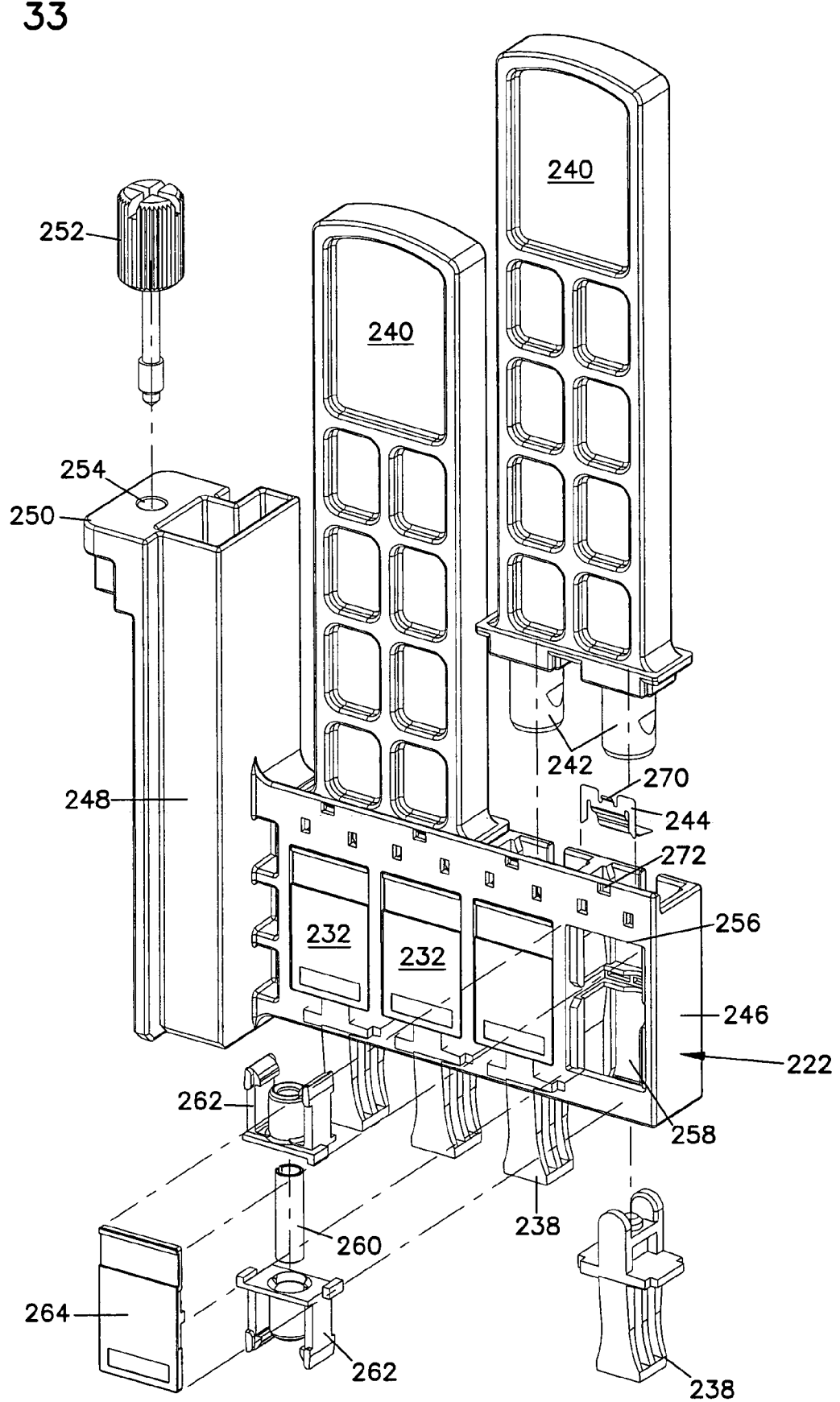
FIG. 33 is a bottom partially exploded perspective view of the adapter assembly of FIG. 32.
Figure 36:
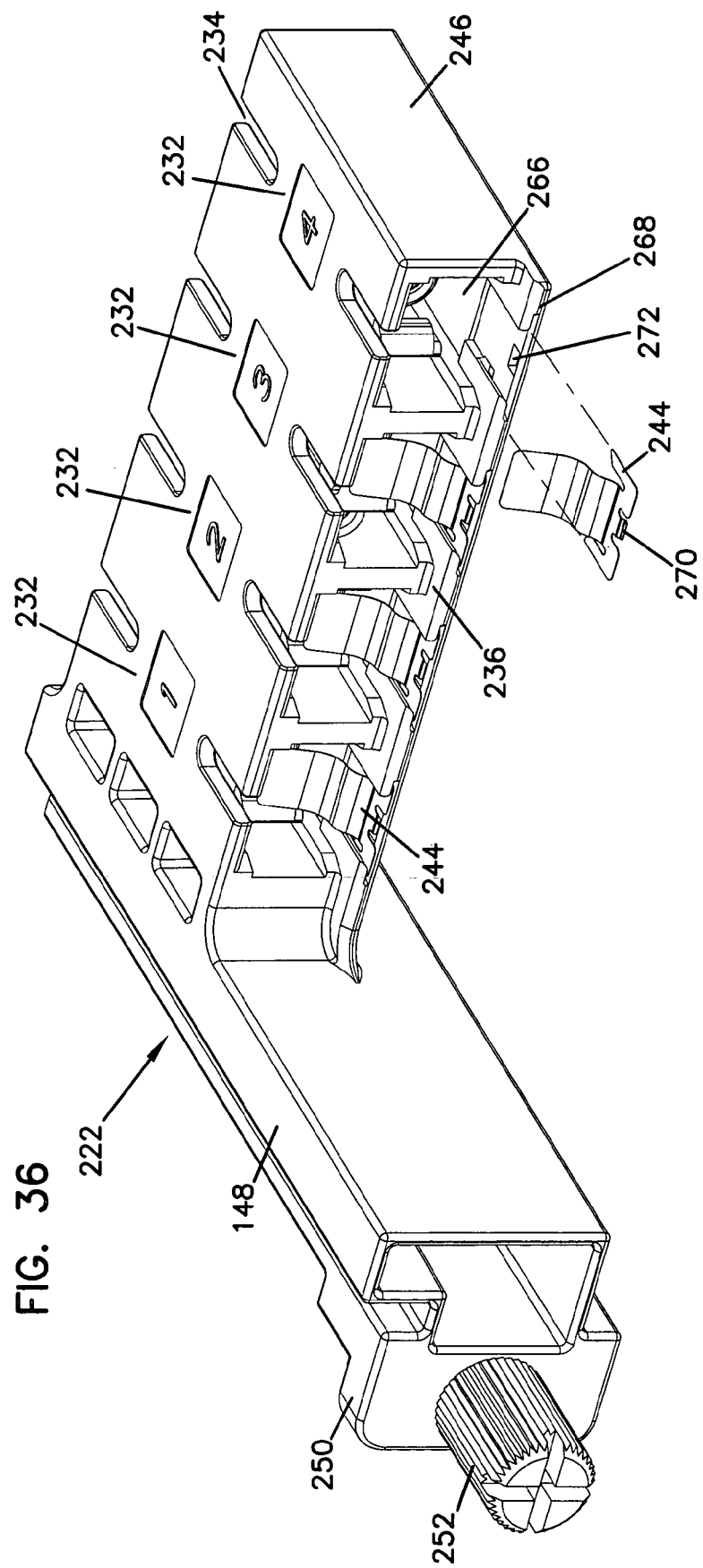
FIG. 36 is a front perspective view of the adapter assembly of FIG. 32, with the dust plugs removed from the adapters and a shutter partially exploded from its mounting position adjacent one of the adapters.
Figure 38:
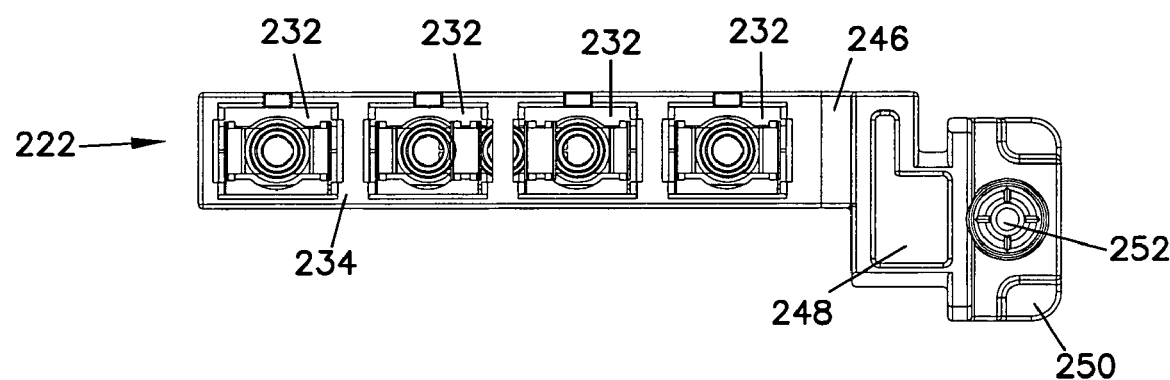
FIG. 38 is a rear view of the adapter assembly of FIG. 36.
Figure 37:
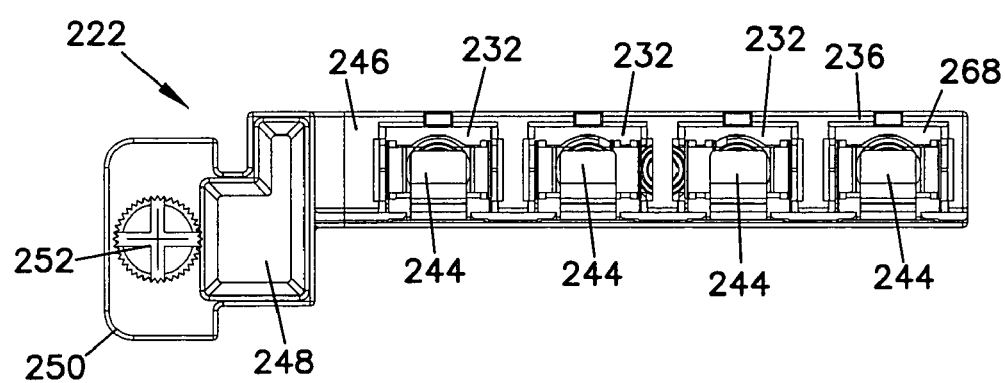
FIG. 37 is a front view of the adapter assembly of FIG. 36.
Figure 41:
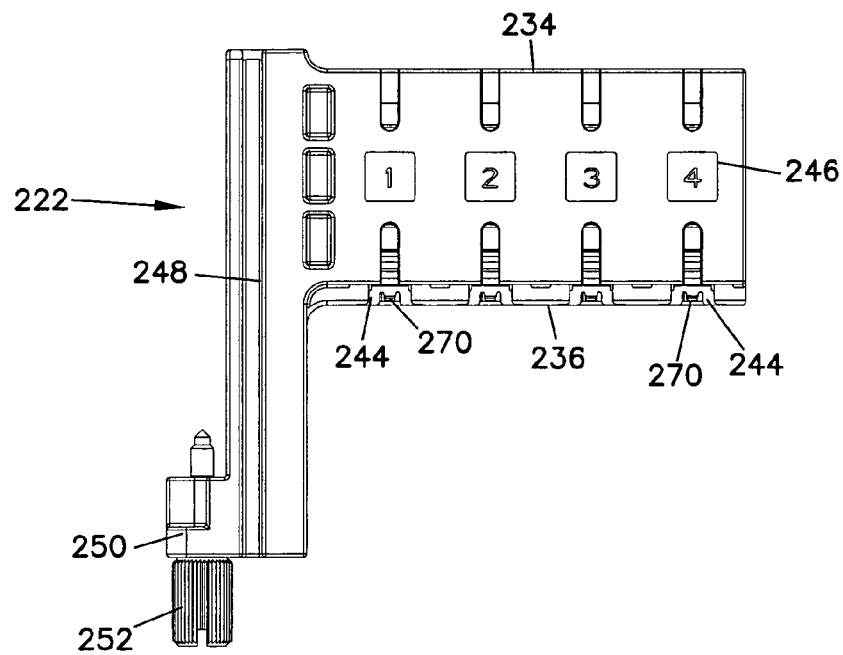
FIG. 41 is a top view of the adapter assembly of FIG. 36.

FIGS. 32 to 35 show adapter assembly 222 removed from chassis 204. Adapter assembly 222 includes four integrated adapters 232 and each adapter has a rear end 234 and a front end 236. As shown in FIGS. 32 and 33, a dust plug 238 is positioned in each rear end 234 and an extended dual dust plug 240 is inserted within the front ends of each pair of adapters 232 to seal the interior of adapters 232 from contaminants. The dual dust plug 240 includes dual tips 242 for insertion into two of the integrally formed adapters 232 of the adapter assembly 222 and a handle at the opposite end, as shown in FIG. 33. Adapter assembly 222 includes an adapter housing portion 246 within which are located adapters 232, and a chassis mounting slide 248 which is received within chassis 204 through front end 214 and which cooperates with chassis 204 to define a mounting location 206. A flange 250 extends from mounting slide 248 and a thumbscrew 252 for securing adapter assembly 222 within chassis 204 extends through flange 250. Screw 252 is positioned within an opening 254, and is preferably a captive fastener, although other fasteners may be used.

As shown in FIG. 33, each adapter 232 is positioned within housing portion 246. Elements of adapter 232 are positioned through an opening 256 into an adapter recess 258. The elements for each adapter 232 include a ferrule alignment sleeve 260 and a pair of inner housing halves 262. These elements are placed within recess 258 in manner similar to that shown in U.S. Pat. No. 5,317,663, issued May 20, 1993, the disclosure of which is incorporated herein by reference. A panel 264 closes opening 256 and secures the elements within each adapter 232.

Referring now to FIGS. 36 to 41, a shutter 244 is positioned within a front opening 266 in front end 236 of each adapter 232 to provide protection against accidental exposure to light. Shutters similar to shutter 244 are described in PCT Publication No. WO 03/093889A1, published on Nov. 12, 2003, the disclosure of which is incorporated herein by reference. Shutter 244 slides into a slot 268 in housing portion 246. A tab 270 extends from shutter 244 and engages a tab recess 272 to retain shutter 244 in position within each adapter 232. While shutter 244 is not essential to the function of adapter 232 in connecting fiber optic cables, it is desirable to provide protection against accidental optical signal exposure that could cause injury to workers or other equipment. Preferably, shutter 244 does not engage the ferrule of the connector inserted into each adapter 232. Instead, the connector housing pushes shutter 244 out of the way.

Figure 42:
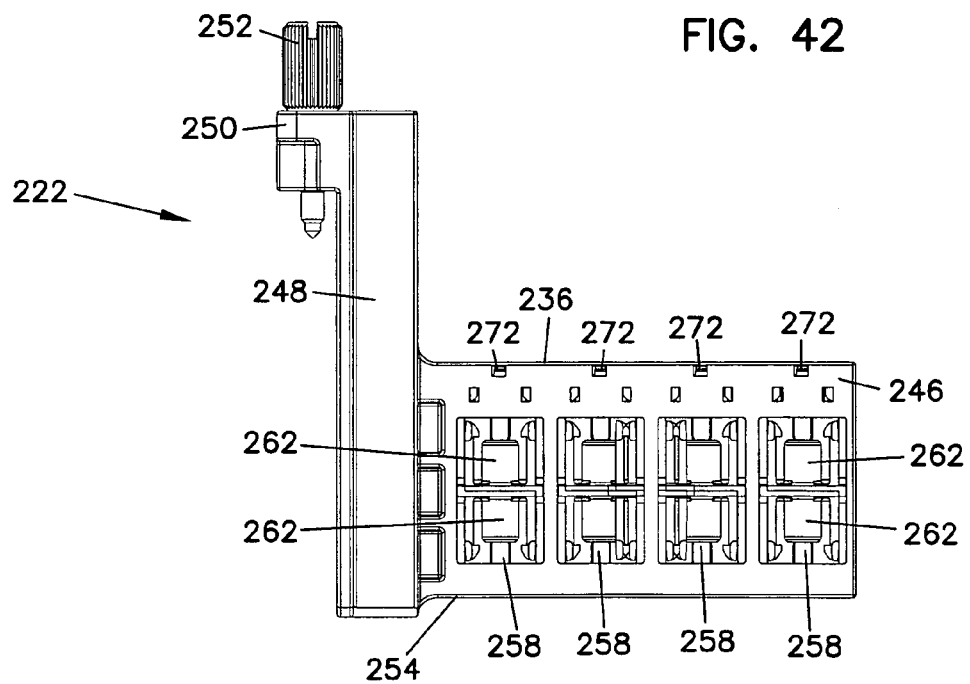
FIG. 42 is a bottom view of the adapter assembly of FIG. 36, with access panels for each adapter of the assembly removed.

FIG. 42 illustrates adapter assembly 222 with access panels 264 removed to show elements of each adapter 232 within recesses 258.

Figure 43:
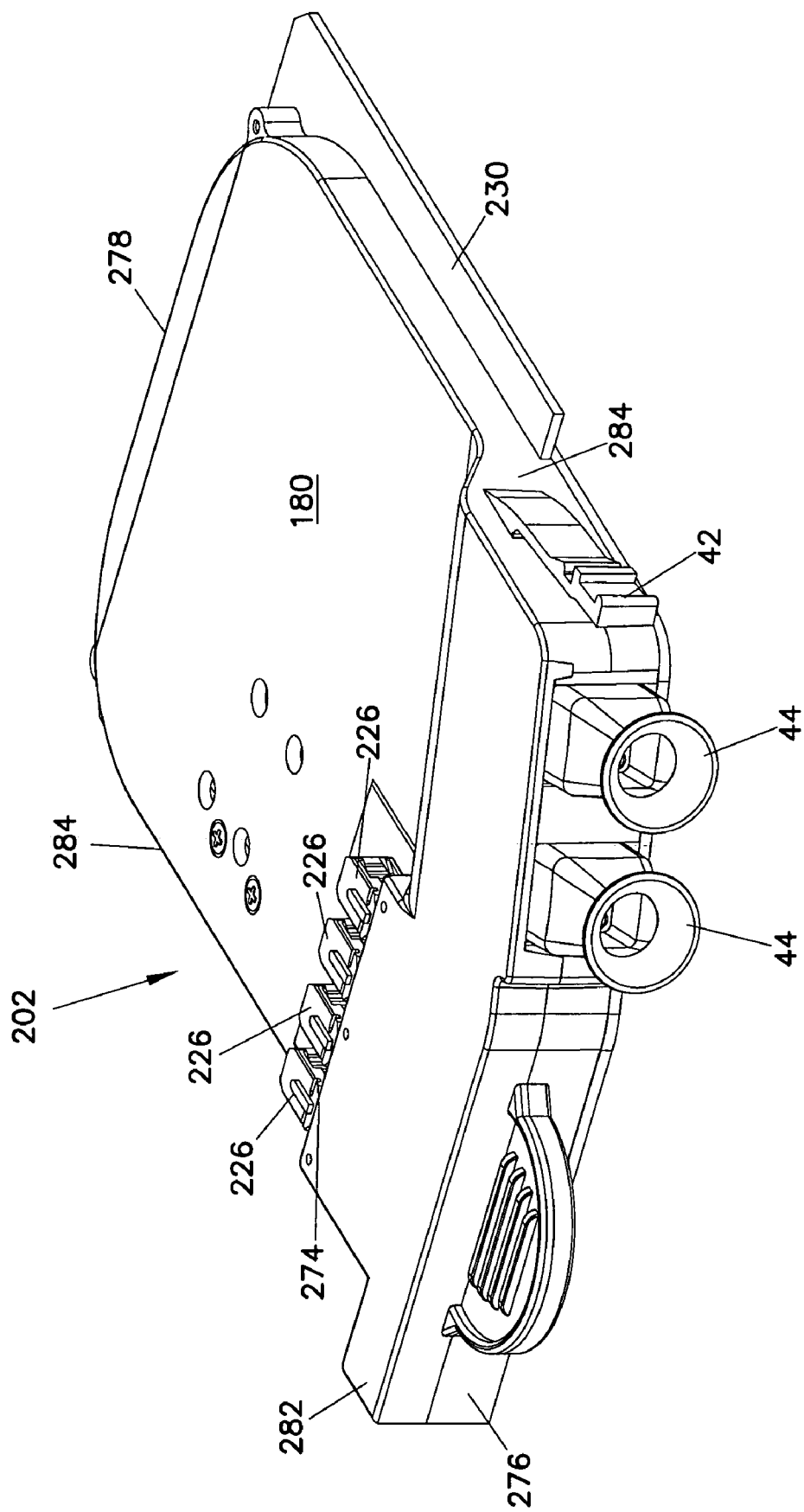
FIG. 43 is a top perspective view of a splitter module according to the present invention for use with the assembly of FIG. 17.

FIG. 43 shows splitter module 202 with side flanges 230 for engaging slots 228 of mounting locations 206 within chassis 204. Connectors 226 are mounted to an inset bulkhead 274 positioned between a front 276 and a rear 278 of a module body 280. A screw cover flange 282 extends from one of a pair of sides 284 of body 280 and latch 42 extends from the other side 284. Flange 282 extends over screw 252 of adapter assembly 222 when module 202 is mounted within chassis 204. This prevents removal of adapter assembly 222 or loosening of screw 252 when module 202 is mounted at a mounting location 206. Cable exits 44 permit passage of optical fibers from within body 280 through front 276 so that the fibers may be extended through cable structure 220 and to other telecommunications equipment.

Figure 44:
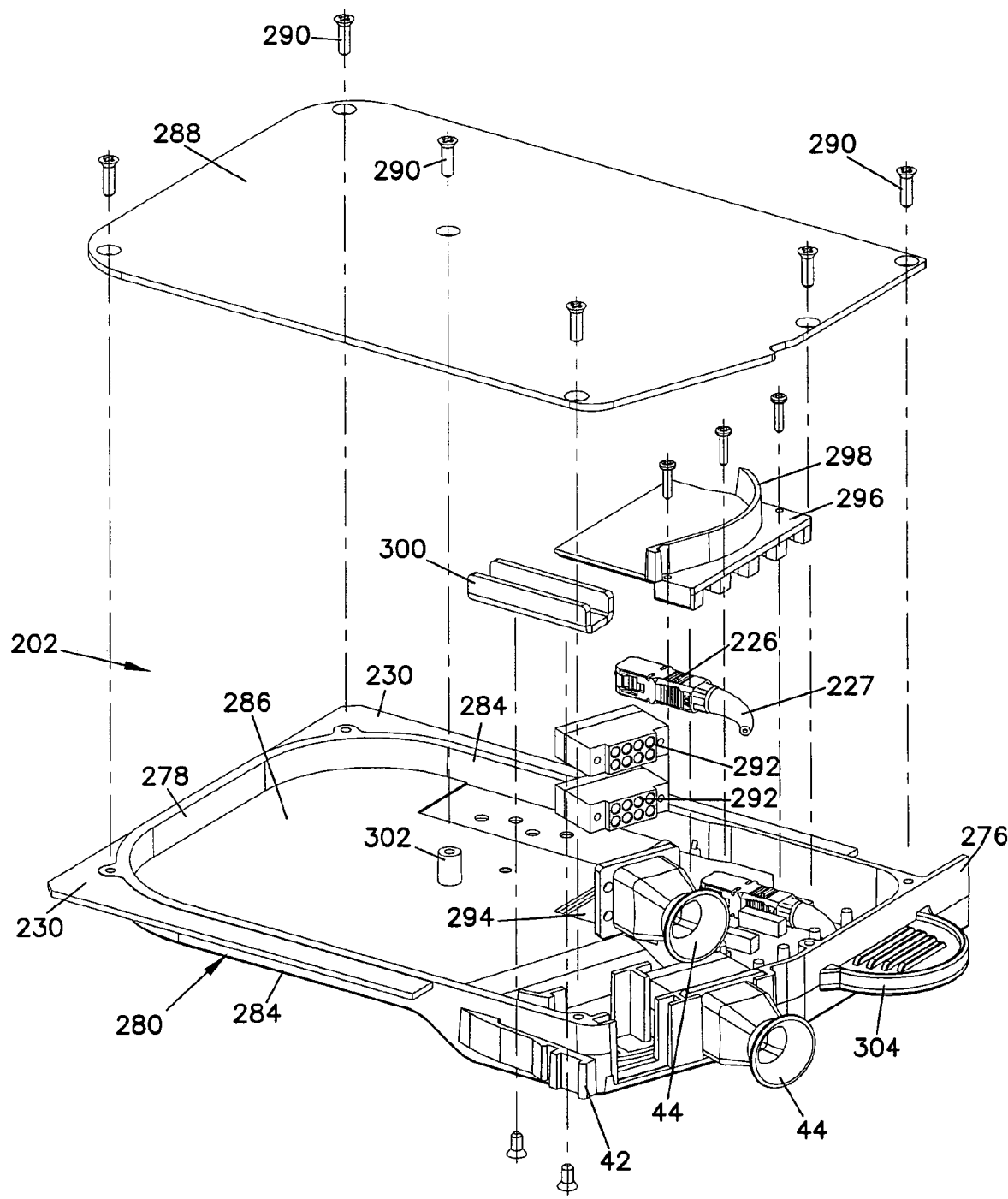
FIG. 44 is a bottom exploded perspective view of the splitter module of FIG. 43.
Figure 45:
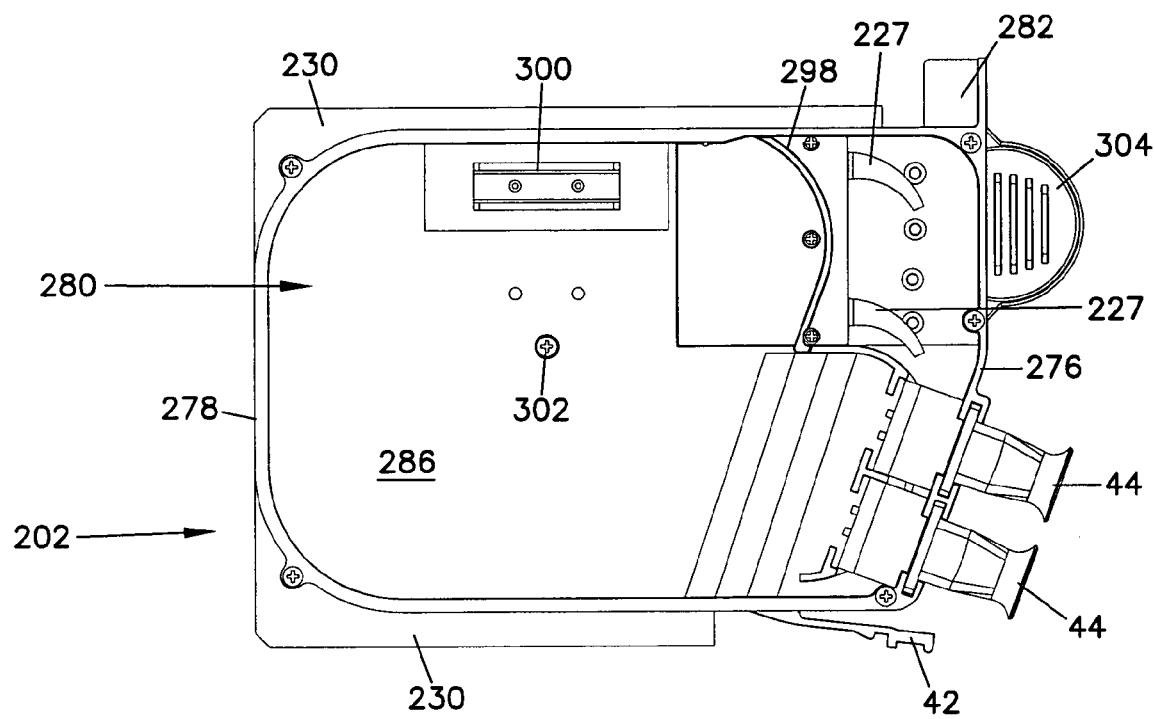
FIG. 45 is a bottom view of the splitter module of FIG. 44, with the cover removed.
Figure 46:
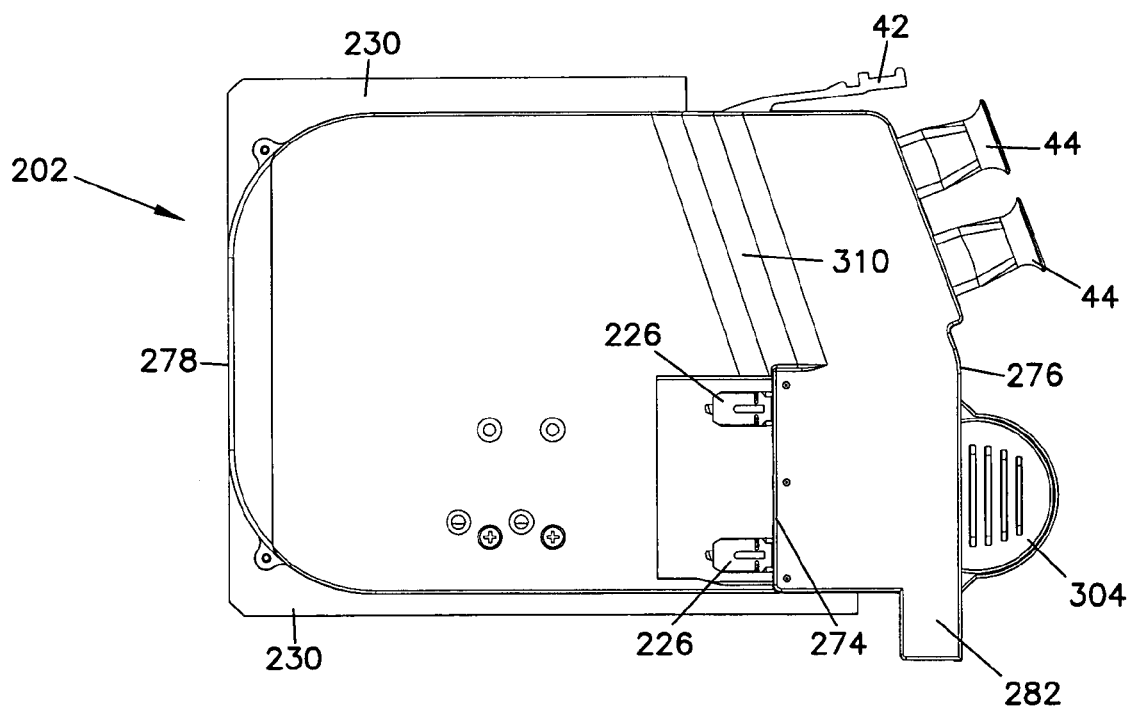
FIG. 46 is a top view of the splitter module of FIG. 43.
Figure 47:
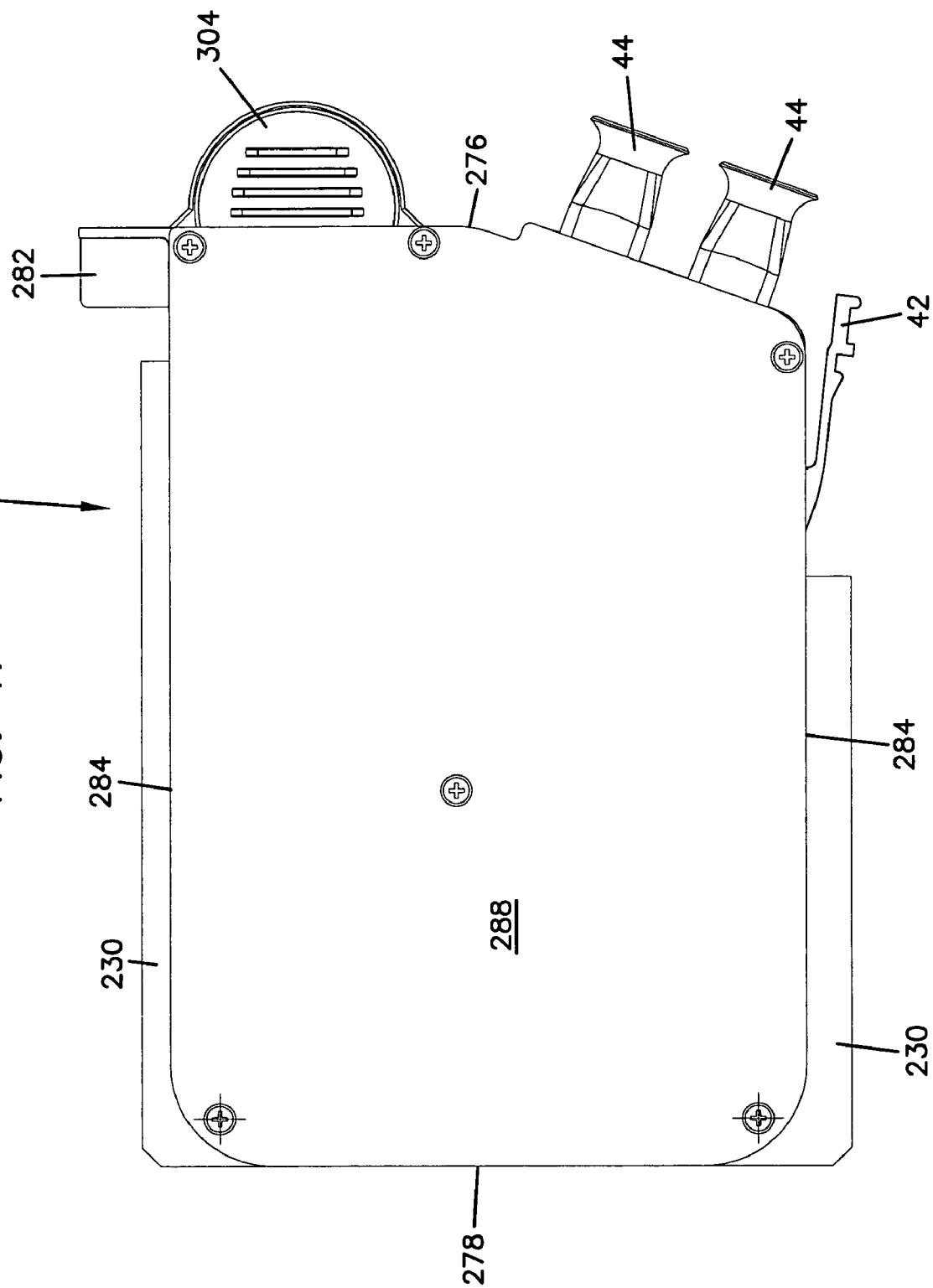
FIG. 47 is a bottom view of the splitter module of FIG. 43.
Figure 51:
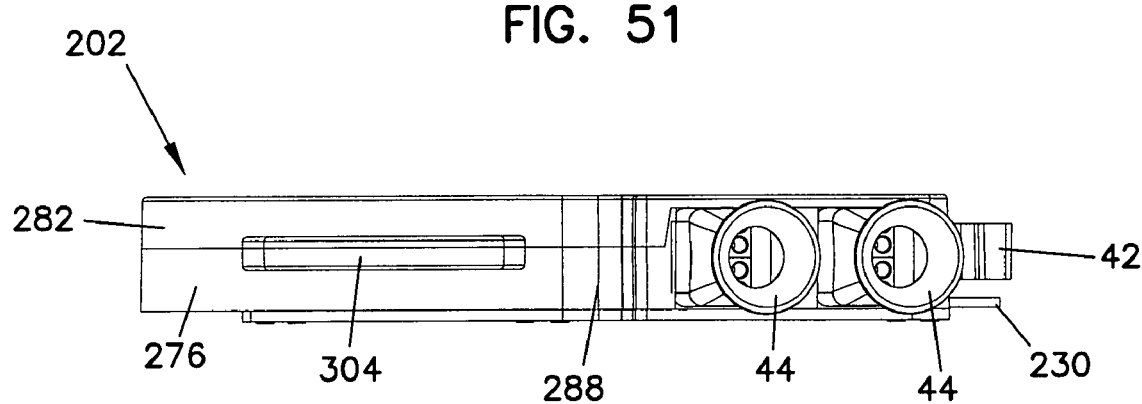
FIG. 51 is a front view of the splitter module of FIG. 43.
Figure 50:
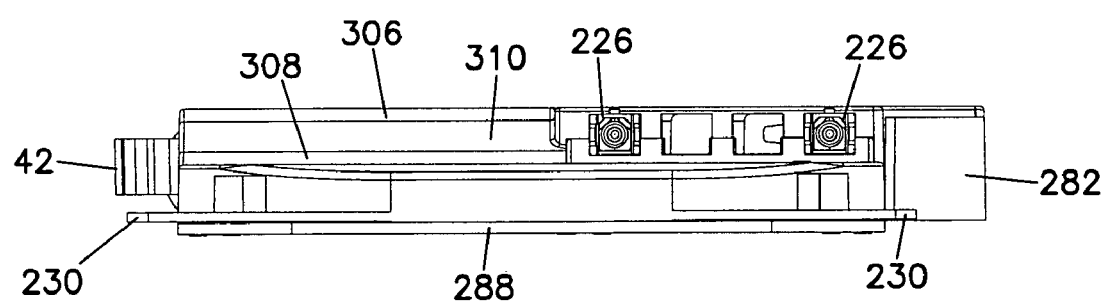
FIG. 50 is a rear view of the splitter module of FIG. 43.

Referring now to FIG. 44, module 202 includes an interior 286 defined by body 280 and removable bottom plate 288, which is held to body 280 by a plurality of removable fasteners such as screws 290. Mounted within interior 286 adjacent and behind each cable exits 44 are a pair of fiber anchors 292. As noted with regard to module 14 above, module 202 preferable houses a splitter which receives a single fiber strand on one end and plurality of fiber strands on the other end. Module 202 includes up to four rear connectors 226 and so may include up to four splitters (not shown in FIG. 44). Within interior 286, each connector 226 may include an angled strain relief boot 227 to provide for redirection of a fiber terminated by connector 226.

Connectors 226 are access from outside interior 286 through an opening 292 in body 180. A connector mounting block 296 spaces and secures connectors 226 for interface with and engagement of adapters 232 of adapter assembly 222. Mounting block 296 also includes an upper cable guide 298 for routing cables within interior 286 between connectors 226 and exits 44. A splitter mount 300 is also included within interior 286 for positioning and securing one or more optical splitters or other optical components within module 202. A central support post and screw boss 302 may also be positioned to provide additional support to bottom plate 288. A finger grip or handle 304 extends from front 276 to provide a convenient grip for removing module 202 from chassis 204, or otherwise assisting in handling.

Referring now to FIGS. 45 to 51, module 202 includes a full depth portion 306 adjacent front 276 and into which connectors 226 direct incoming fibers, and a partial depth portion 308 beginning adjacent connectors 226 and extending to rear 278. The number of connectors 226 that may be mounted to module 202 does not permit sides 184 from being moved toward each other, reducing the width of interior 286, without encroaching too significantly on cable routing space within interior 286. Having partial depth portion 308 extending from rear 278 to connectors 226 permits adapters to be overlapped with body 280, which is not possible with module 14, described above. The reduced depth does reduce the volume of interior 286 but does not adversely impact bend radius requirements within interior 286. A transition 310 provides a smooth flow between the depths of portions 306 and 308. A smooth transition may be desirable to reduce any sharp angles within interior 286 that fibers may come in contact with, and also may permit easier forming or construction of body 280.

In module 202, connectors 226 are positioned within the top vie footprint of body 280, i.e., between sides 284, and are also inset from rearmost extension of module 202, i.e., rear 278.

Modules 202 are configured so that they can be mounted within chassis 204 from the front without having to access any rear connections, once the adapter assemblies 222 have been positioned and connected to cables. Access to cables and connectors connected to rear end 234 of adapter assemblies 222 may be provided by pulling the assemblies through front 214 of chassis 204 by releasing screw 252 so that these connectors may be accessed for inspection or cleaning.

The above specification, examples and data provide a complete description of the manufacture and use of the invention. Since many embodiments of the invention can be made without departing from the spirit and scope of the invention, the invention resides in the claims hereinafter appended.

What is claimed is:

1. A telecommunications assembly comprising:
   a chassis and a module mounted within the chassis;
   the chassis including:
   a housing with a top, a bottom, and opposing sides, defining an interior space accessible through an open front, the interior space substantially closed off by a back opposite the open front;
   at least one mounting location within the interior space;
   at least one fiber optic adapter assembly corresponding to each of the mounting locations mounted within the interior space, each adapter assembly mounted within the chassis separately from the module, wherein the module and adapter assembly engage each other when the adapter assembly and the module are mounted within the chassis, each adapter assembly including a unitary housing with a plurality of adapters integrally formed in the unitary housing, each adapter including a front end directed toward the open front and a back end directed toward the back, and an access opening positioned between the front and back ends, each end configured to receive a fiber optic connector, the fiber optic adapter assembly including inner housing components and a ferrule alignment sleeve for each adapter, wherein the access opening is sized to permit the inner housing components and the ferrule alignment sleeve to be positioned within the adapter between the front and back ends, wherein a panel is positioned within the access opening of each adapter to hold the inner housing components and the ferrule alignment sleeve within the adapter; and,
   each adapter assembly housing including a mounting portion adjacent one of the sides of the chassis, the adapter assembly removable from the interior through the open front of the chassis to permit access to the back end of the adapters of the adapter assembly, the adapter assembly positioning the adapters within the interior behind the open front; and,
   the module mounted at one of the mounting locations and including a housing with a bulkhead to which is mounted a plurality of fiber optic connectors engaging the plurality of fiber optic adapters of the adapter assembly, the bulkhead of the module positioned forward of a rear most extension of the housing of the module.

2. The telecommunications assembly of claim 1, the module further comprising:
   a body defining an interior;
   at least one optical component within the interior of the housing; and
   a front with a cable exit.

3. The telecommunications assembly of claim 1, wherein the adapter assembly positions the plurality of adapters forward of the back of the chassis.

4. The telecommunications assembly of claim 1, wherein each module includes a pair of opposing mounting flanges and each mounting location includes a pair of opposing slots to receive the flanges of the modules.

5. The telecommunications assembly of claim 2, wherein the body of the module defines a shallower depth between the bulkhead and the rear of the module and a greater depth between the bulkhead and the front of the module.

6. The telecommunications assembly of claim 1, wherein the adapter assembly is positioned adjacent one of the sides of the chassis and the mounting portion extends along the adjacent side to the front opening, the mounting portion releasably held to the chassis by a removable fastener.

7. The telecommunications assembly of claim 6, wherein the adapter assembly is held at the mounting location by a releasable fastener and the front of the module includes an extension which prevents access to the releasable fastener when the module is mounted at the mounting location.

8. The telecommunications assembly of claim 6, wherein the removable fastener is a thumbscrew captively held by a forward extension of the adapter assembly and releasably received within a fastener opening of the chassis.

9. The telecommunications assembly of claim 1, wherein the module is held at the mounting location by a releasable latch.

10. The telecommunications assembly of claim 2, wherein the module includes a four fiber optic connectors on the bulkhead, and the adapter assembly includes four fiber optic adapters which each receive one of the fiber optic connectors.

11. The telecommunications assembly of claim 2, wherein the module includes a pair of cable exits on the front.

12. The telecommunications assembly of claim 2, wherein the cable exit includes a bell shaped portion to provide bend radius protection to optical fiber cables extending through the cable exit.

13. The telecommunications assembly of claim 1, wherein one of the mounting locations of the chassis further includes a fiber optic cable extending to and received within the rear of the one of the plurality of fiber optic adapters of the adapter assembly, and removal of the adapter assembly through the front opening of the chassis allows access to the fiber optic cable received within the rear of the adapter.

14. The telecommunications assembly of claim 13, wherein the fiber optic cable extending to the rear of the fiber optic adapter may be accessed by removing the adapter assembly through the front opening of the chassis, the fiber optic cable may be removed from the rear of the adapter and cleaned, the fiber optic cable may be replaced within the adapter and the adapter assembly repositioned within the chassis.

15. A method of mounting a module within a chassis comprising:
   providing the chassis including a front opening and a module mounting location, an adapter assembly positioned within an interior of the chassis at the module mounting location and accessible through the front opening, the adapter assembly including a unitary body including a plurality of fiber optic adapters integrally formed with the unitary body with a connector of a fiber optic cable received in a rear of each adapter, each adapter including an access opening positioned between the rear and a front of the adapter, the adapter assembly including inner housing components and a ferrule alignment sleeve for each adapter, wherein the access opening is sized to permit the inner housing components and the ferrule alignment sleeve to be positioned within the adapter between the front and the rear of the adapter, wherein a panel is positioned within the access opening of each adapter to hold the inner housing components and the ferrule alignment sleeve within the adapter, and further providing a module adapted to be mounted at the mounting location, the module including a bulkhead with a plurality of fiber optic connectors;

removing the adapter assembly from the interior of the chassis through the front opening;

removing the connector of the fiber optic cable from the rear of the adapter and inspecting an endface of an optical fiber within the fiber optic cable;

replacing the connector with the fiber optic cable within the rear of the adapter;

replacing the adapter assembly within the chassis at the mounting location;

inserting the module within the chassis through the front opening at the mounting location and engaging the front of each adapter with one of the connectors of the bulkhead of the module.

16. A telecommunications module comprising:

a body defining an interior and including first and second opposing sides, a front, a rear defining a rear-most extension of the body, and a bulkhead positioned between the front and the rear;

the bulkhead positioned between the sides and adjacent one of the sides of the body and accessible from the rear of the body;

the body defining a shallower depth between the bulkhead and the rear and a greater depth between the bulkhead and the front;

a mounting flange extending beyond each side of the body;

a plurality of fiber optic connectors mounted to the bulkhead and positioned to be inserted into a mating adapter with a rearward movement of the body;

at least one cable exit positioned in the front of the body, each cable exit including a bell shaped outer extension beyond the front of the body.

17. The telecommunications module of claim 16, further comprising a handle extending from the front of the body adjacent the at least one cable exit.

18. The telecommunications module of claim 16, wherein the front further comprises a flange extending beyond the mounting flange on side of the body.

19. A fiber optic telecommunications chassis comprising:

a housing with a first major side, a second major side, and a pair of opposing transverse sides extending between the major sides defining an interior with a front opening and a back opposite the front opening;

a plurality of mounting locations defined for telecommunications modules inserted through the front opening with the modules generally oriented parallel to one of the transverse sides;

each mounting location including an adapter assembly positioned adjacent one of the first or second major sides, the adapter assembly removably mounted within the interior of the housing and including a unitary housing with a plurality of integrally formed fiber optic adapters, each fiber optic adapter including a front end and a rear end, the adapter assembly including an access opening positioned between the front end and the rear end, each end configured to receive a mating fiber optic connector, each telecommunications module configured to be mounted within the housing separately from the removably mounted adapter assemblies, wherein the telecommunications modules and adapter assemblies are configured to engage each other when the telecommunications modules are mounted within the chassis;

each adapter assembly orienting the at least one fiber optic adapter with a front end positioned to receive the mating fiber optic connector inserted through the front opening toward the back and generally parallel to the sides;

each adapter assembly positioned to hold the plurality of adapters within the interior of the housing at a location behind the front opening and forward of the back, so that a fiber optic cable with a mating fiber connector may be directed to and inserted within the rear end of the adapter;

the adapter assembly removable from the interior of the housing so that the rear end of the plurality of adapters may be accessed outside of the interior, the adapter assembly including inner housing components and a ferrule alignment sleeve for each fiber optic adapter, wherein the access opening is sized to permit the inner housing components and the ferrule alignment sleeve to be positioned within the fiber optic adapters between the front and rear ends, wherein a panel is positioned within the access opening to hold the inner housing components and the ferrule alignment sleeve within the fiber optic adapter.

20. The fiber optic telecommunications chassis of claim 18, further comprising a dust plug including a handle accessible from the front opening of the chassis and dual tips for insertion into two of the integrally formed adapters of the fiber optic adapter assembly, the dust plug inserted within ends of the fiber optic adapters to seal interiors of the adapters from contaminants.

21. A telecommunications assembly comprising:

a chassis and a module mounted within the chassis;

the chassis including:

a housing with a top, a bottom, and opposing sides, defining an interior space accessible through an open front, the interior space substantially closed off by a back opposite the open front;

at least one mounting location within the interior space;

at least one fiber optic adapter assembly corresponding to each of the mounting locations mounted within the interior space, each adapter assembly including a unitary housing with a plurality of adapters integrally formed in the unitary housing, each adapter including a front end directed toward the open front and a back end directed toward the back, each end configured to receive a fiber optic connector; and, each adapter assembly housing including a mounting portion adjacent one of the sides of the chassis, the adapter assembly removable from the interior through the open front of the chassis to permit access to the back end of the adapters of the adapter assembly, the adapter assembly positioning the adapters within the interior behind the open front; and, the module mounted at one of the mounting locations and including a housing with a bulkhead to which is mounted a plurality of fiber optic connectors engaging the plurality of fiber optic adapters of the adapter assembly, the bulkhead of the module positioned forward of a rear most extension of the housing of the module, the module further comprising a body defining an interior, at least one optical component within the interior of the body, and a front with a cable exit, wherein the body of the module defines a shallower depth between the bulkhead and the rear of the module and a greater depth between the bulkhead and the front of the module.

22. A telecommunications assembly comprising:

a chassis and a module mounted within the chassis;

the chassis including:
- a housing with a top, a bottom, and opposing sides, defining an interior space accessible through an open front, the interior space substantially closed off by a back opposite the open front;
- at least one mounting location within the interior space;
- at least one fiber optic adapter assembly corresponding to each of the mounting locations mounted within the interior space, each adapter assembly mounted within the chassis separately from the module, wherein the module and adapter assembly engage each other when the adapter assembly and the module are mounted within the chassis, each adapter assembly including a unitary housing with a plurality of adapters integrally formed in the unitary housing, each adapter including a front end directed toward the open front and a back end directed toward the back, each end configured to receive a fiber optic connector; and,
- each adapter assembly housing including a mounting portion adjacent one of the sides of the chassis, the adapter assembly removable from the interior through the open front of the chassis to permit access to the back end of the adapters of the adapter assembly, the adapter assembly positioning the adapters within the interior behind the open front; and, the module mounted at one of the mounting locations and including a housing with a bulkhead to which is mounted a plurality of fiber optic connectors engaging the plurality of fiber optic adapters of the adapter assembly, the module further including a body defining an interior and at least one optical component within the interior, and a front with a cable exit, the bulkhead of the module positioned forward of a rear most extension of the housing of the module, wherein the body of the module defines a shallower depth between the bulkhead and a rear of the module and a greater depth between the bulkhead and the front of the module.

* * * * *

UNITED STATES PATENT AND TRADEMARK OFFICE
CERTIFICATE OF CORRECTION

PATENT NO. : 7,400,813 B2
APPLICATION NO. : 11/138063
DATED : July 15, 2008
INVENTOR(S) : Zimmel Page 1 of 1

It is certified that error appears in the above-identified patent and that said Letters Patent is hereby corrected as shown below:

Col. 12, line 30, claim 20: "18, further" should read --19, further--

Signed and Sealed this

Twenty-fourth Day of February, 2009

JOHN DOLL
*Acting Director of the United States Patent and Trademark Office*